(12) United States Patent
Black et al.

(10) Patent No.: US 10,349,488 B2
(45) Date of Patent: Jul. 9, 2019

(54) SOFTWARE CONFIGURABLE LIGHTING DEVICE

(71) Applicant: ABL IP HOLDING LLC, Conyers, GA (US)

(72) Inventors: Mark A. Black, Lawsonville, NC (US); Jack C. Rains, Jr., Herndon, VA (US); David P. Ramer, Reston, VA (US); Rashmi Kumar Raj, Herndon, VA (US); An Mao, Reston, VA (US); Ravi Kumar Komanduri, Dulles, VA (US); Hampton Boone Maher, Washington, DC (US)

(73) Assignee: ABL IP HOLDING LLC, Conyers, GA (US)

(*) Notice: Subject to any disclaimer, the term of this patent is extended or adjusted under 35 U.S.C. 154(b) by 328 days.

(21) Appl. No.: 15/209,878

(22) Filed: Jul. 14, 2016

(65) Prior Publication Data

US 2017/0018214 A1    Jan. 19, 2017

Related U.S. Application Data

(60) Provisional application No. 62/193,859, filed on Jul. 17, 2015.

(51) Int. Cl.
| | |
|---|---|
| *G09G 3/34* | (2006.01) |
| *G02B 26/08* | (2006.01) |
| *H05B 37/02* | (2006.01) |
| *G02F 1/29* | (2006.01) |
| *G02B 1/04* | (2006.01) |

(52) U.S. Cl.
CPC ..... *H05B 37/0209* (2013.01); *G02B 26/0883* (2013.01); *G02F 1/29* (2013.01); *G02F 1/292* (2013.01); *H05B 37/0245* (2013.01); *G02B 1/04* (2013.01); *G02B 26/0833* (2013.01); *G02B 2207/115* (2013.01); *G02F 2001/294* (2013.01); *G09G 3/348* (2013.01); *G09G 2320/0633* (2013.01)

(58) Field of Classification Search
None
See application file for complete search history.

(56) References Cited

U.S. PATENT DOCUMENTS

| | | |
|---|---|---|
| 4,956,619 A | 9/1990 | Hornbeck |
| 5,184,114 A | 2/1993 | Brown |
| 5,769,527 A | 6/1998 | Taylor et al. |

(Continued)

OTHER PUBLICATIONS

International Preliminary Report on Patentability for International Application No. PCT/US2016/042243, dated Jan. 23, 2018, 12 pages.

(Continued)

*Primary Examiner* — Amr A Awad
*Assistant Examiner* — Stephen A Bray
(74) *Attorney, Agent, or Firm* — RatnerPrestia

(57) ABSTRACT

The examples relate to various implementations of a software configurable lighting device, installed as a panel, that offers the capability to appear like and emulate a variety of different lighting devices. Emulation includes the appearance of the lighting device as installed in the wall or ceiling, possibly, both when lighting and when not lighting, as well as light output distribution, e.g. direction and/or beam shape.

28 Claims, 19 Drawing Sheets

(56) References Cited

U.S. PATENT DOCUMENTS

| | | | |
|---|---|---|---|
| 6,111,560 | A | 8/2000 | May |
| 6,995,355 | B2 | 2/2006 | Rains, Jr. |
| 7,675,500 | B2 | 3/2010 | Daly |
| 8,167,439 | B2 * | 5/2012 | Yamada .............. H04N 9/3155 348/743 |
| 8,177,390 | B2 | 5/2012 | Miskin |
| 8,779,669 | B2 | 7/2014 | Ramer |
| 8,982,313 | B2 | 3/2015 | Escuti |
| 8,994,291 | B2 | 3/2015 | Ramer |
| 9,192,029 | B2 | 11/2015 | Marquardt et al. |
| 9,497,833 | B2 | 11/2016 | Marquardt et al. |
| 2002/0021267 | A1 | 2/2002 | Walker et al. |
| 2002/0070914 | A1 | 6/2002 | Bruning et al. |
| 2003/0227416 | A1 | 12/2003 | Meitzler et al. |
| 2004/0095558 | A1 | 5/2004 | Whitehead |
| 2004/0100589 | A1 | 5/2004 | Ben-David |
| 2006/0181775 | A1 | 8/2006 | Willemsen et al. |
| 2007/0035706 | A1 * | 2/2007 | Margulis .............. G03B 21/20 353/122 |
| 2007/0052660 | A1 * | 3/2007 | Montbach ........... G02B 26/005 345/102 |
| 2007/0164975 | A1 * | 7/2007 | Lim .................. F21V 33/0052 345/102 |
| 2009/0241390 | A1 * | 10/2009 | Roberts .............. H05B 37/0254 40/553 |
| 2010/0117941 | A1 | 5/2010 | Schulz |
| 2011/0069960 | A1 * | 3/2011 | Knapp ................. H04L 12/43 398/103 |
| 2011/0159929 | A1 * | 6/2011 | Karaoguz .......... H04N 21/4312 455/566 |
| 2011/0215725 | A1 | 9/2011 | Paolini |
| 2012/0032874 | A1 * | 2/2012 | Mukawa ................ G02B 3/12 345/8 |
| 2012/0056556 | A1 * | 3/2012 | Laski ................. H05B 33/0857 315/294 |
| 2012/0092735 | A1 * | 4/2012 | Futterer ................ G02B 5/32 359/11 |
| 2012/0092750 | A1 | 4/2012 | Kroll |
| 2013/0069960 | A1 | 3/2013 | McCombe et al. |
| 2013/0249404 | A1 | 9/2013 | Eckel |
| 2014/0058566 | A1 | 2/2014 | Rains |
| 2015/0085475 | A1 | 3/2015 | Ryu |
| 2015/0085481 | A1 | 3/2015 | Ryu |
| 2015/0264341 | A1 | 9/2015 | Seshadri et al. |
| 2015/0289344 | A1 | 10/2015 | Leadford et al. |
| 2015/0301781 | A1 | 10/2015 | Ekkaia et al. |
| 2015/0345724 | A1 | 12/2015 | Leadford et al. |
| 2016/0123541 | A1 | 5/2016 | Quilici et al. |
| 2016/0128140 | A1 | 5/2016 | Quilici et al. |
| 2016/0217749 | A1 | 7/2016 | Aggarwal |

OTHER PUBLICATIONS

International Preliminary Report on Patentability for International Application No. PCT/US20161042278, dated Jan. 23, 2018, 20 pages.

International Preliminary Report on Patentability for International Application No. PCT/US2016/042284, dated Jan. 23, 2018, 15 pages.

Seam Labs, "Beam. The smart projector that fits in any light socket", downloaded Oct. 20, 2016 from http://beamlabsinc.com/ 2016 Beam Labs BV, The Netherlands, 5 pages.

Amazon Launchpad, "Beam, the Smart Projector that Fits in Any Light Socket by Beam", downloaded on Oct. 20, 2016 from https://www.amazon.com/Beam-Smart-Projector-Light-Socket/dp/ B017IKR2NM—Interst Based Ads 19906-2016, Amazon.com, Inc. or its affiliates, 5 pages.

Escuti et al., "Polarization-Indiependent LC Microdisplays Using Liquid Crystal Polarization Gratings: A viable Solution", Dept. of Electrical & Computer Engineering, North Carolina State University, Jul. 1, 2008, 30 pages.

Nersisyan et al., "Polarization Insensitive Imaging Through Polarization Gratings", Optics Express, vol. 17, No. 3, Feb. 2, 2009, pp. 1817-1830.

Kim et al., Wide-angle, nonmechanical beam steering using thin liquid crystal polarization gratings, Proc. of SPIE, vol. 1093, 12 pages.

Oh et al., "Polarization-Independent Modulation USing Standard Liquid Crystal Microdisplays and Polymer Polarization Gratings", Department of Electrical and comuter Engineering, North Carolina State University, 2008, 4 pages.

Heidenfeld et al, "Recent Progres in Arrayed Electrowetting Optics", OPN, 2009, 7 pages.

Hou et al., "A full description of a scalable microfabrication process for arrayed elecrowetting microprisms", Journal of Micromechanics and Microengineering, vol. 20, © 2010, 12 pages.

Komanduri et al., "Polarization-independent modulation for prjection displays using small-period L.C. polarization gratings", Journal of the Society for Information Display, vol. 15, No. 8, 2007, pp. 589-594.

McManamon et al., "A Review of Phased Array Steering for Narrow-Band Electrooptical Systems", Porceediings of the IEEE, vol. 97, No. 6, Jun. 2009, pp. 1078-1096.

Hsieh et al., "Sophisticated oil film geometries through incomplete electrical dewetting by feedback control and Fourier construction", Lab Chip, vol. 15, pp. 2615-2624, published May 7, 2015.

International Search Report and Written Opinion of the International Searching Authority for International Application No. PCT/US2016/042243, dated Nov. 16, 2016, 30 pages.

International Search Report and Written Opinion of the International Searching Authority for International Application No. PCT/US2016/042278, dated Nov. 29, 2016, 22 pages.

International Search Report and Written Opinion of the International Searching Authority for International Application No. PCT/US2016/042284, dated Sep. 22, 2016, 16 pages.

Non Final Office Action for U.S. Appl. No. 15/210,045, dated Oct. 5, 2018, 45 pages.

Non Final Office Action for U.S. Appl. No. 15/210,328, dated Sep. 20, 2018, 28 pages.

NonFinal Office Action for U.S. Appl. No. 15/210,328, dated Jan. 24, 2019, 10 pages.

Final Office Action for U.S. Appl. No. 15/210,045, dated Feb. 26, 2019, 23 pages.

* cited by examiner

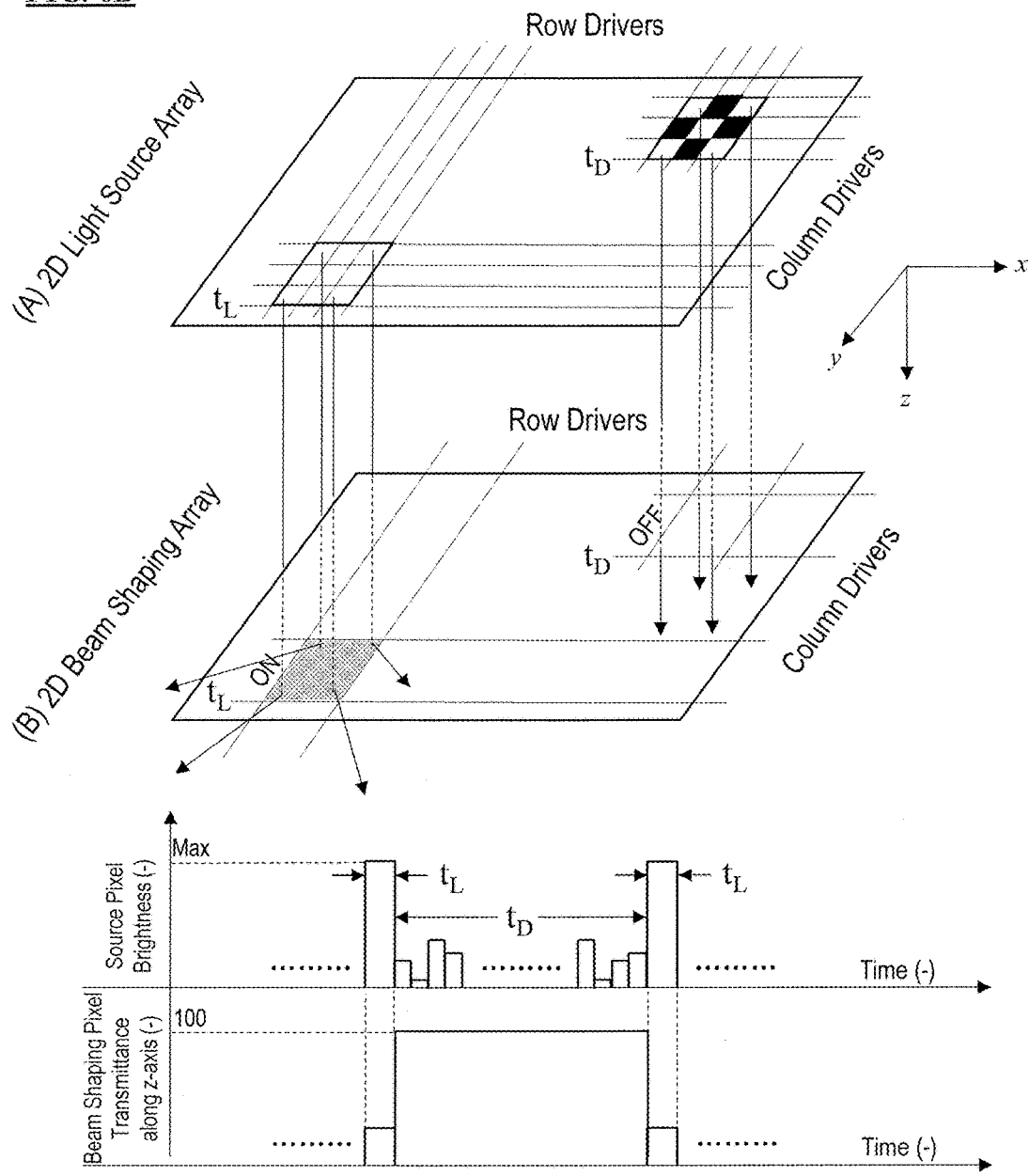

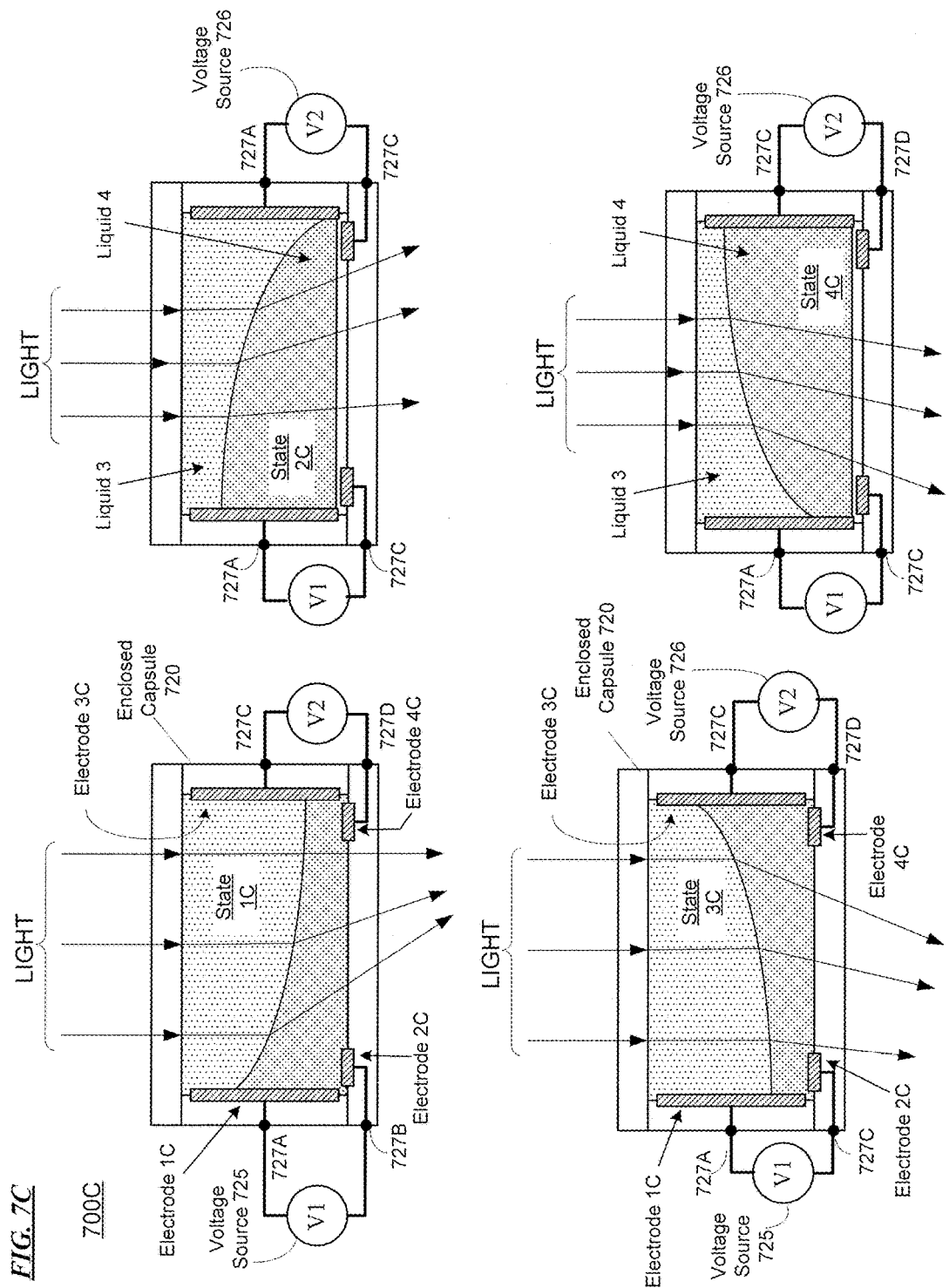

Off State: V = Voff
On State: V= Von

900
Side view

900
Top view

1400

1400

SOFTWARE CONFIGURABLE LIGHTING DEVICE

CROSS-REFERENCE TO RELATED APPLICATION

This application claims priority of U.S. Provisional Patent Application No. 62/193,859, filed on Jul. 17, 2015 and entitled "Software Configurable Lighting Device," the entire contents of which are incorporated herein by reference.

TECHNICAL FIELD

The present subject matter relates to lighting devices, and to configurations and/or operations thereof, whereby a lighting device is configurable by software, e.g. to emulate a variety of different lighting devices.

BACKGROUND

Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space. The optical distribution of the light output, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

To the extent that multiple distribution patterns are needed for different lighting applications, multiple luminaires must be provided. To meet the demand for different appearances and/or different performance (including different distributions), a single manufacturer of lighting devices may build and sell thousands of different luminaires.

Some special purpose light fixtures, for example, fixtures designed for stage or studio type lighting, have implemented mechanical adjustments. Mechanically adjustable lenses and irises enable selectable adjustment of the output light beam shape, and mechanically adjustable gimbal fixture mounts or the like enable selectable adjustment of the angle of the fixture and thus the direction of the light output. The adjustments provided by these mechanical approaches are implemented at the overall fixture output, provide relatively coarse overall control, and are really optimized for special purpose applications, not general lighting.

There have been more recent proposals to develop lighting devices offering electronically adjustable light beam distributions, using a number of separately selectable/controllable solid state lamps or light engines within one light fixture. In at least some cases, each internal light engine or lamp may have an associated adjustable electro-optic component to adjust the respective light beam output, thereby providing distribution control for the overall illumination output of the fixture.

Although the more recent proposals provide a greater degree of distribution adjustment and may be more suitable for general lighting applications, the outward appearance of each lighting device remains the same even as the device output light distribution is adjusted. There may also be room for still further improvement in the degree of adjustment supported by the lighting device.

There also have been proposals to use displays or display-like devices mounted in or on the ceiling to provide variable lighting. The Fraunhofer Institute, for example, has demonstrated a lighting system using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices are optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture. Liquid crystal displays (LCD) also are rather inefficient. For example, backlights in LCD televisions have to produce almost ten times the amount of light that is actually delivered at the viewing surface. Therefore, any LCD displays that are to be used as lighting products need to be more efficient than typical LCD displays for the lighting device implementation to be commercially viable.

SUMMARY

Hence, for the reasons outlined above or other reasons, there is room for further improvement in lighting devices.

An example of apparatus as disclosed herein includes a pixel controllable light generation and pixel controllable spatial light distribution system, a driver, a memory and a processor. The driver is coupled to the controllable system to control pixel level generation of light and pixel level spatial distribution of the generated light by the controllable system. The processor has access to the memory and is coupled to the driver to control operation of the driver. The memory stores programming that when executed by the processor configures the lighting device to perform functions including functions to obtain an image selection and a general lighting distribution selection as software control data. Based on the image selection, the processor causes the controllable system to present an image output. The processor also causes the controllable system to emit light for general illumination having the selected light distribution. The emitted light is generated for general illumination of the space in which apparatus is located.

In some examples, each pixel includes at least a pixel light source and a pixel spatial light modulator. The pixel light source is electrically controllable with respect to one or more light output parameters such as light intensity or a light color characteristic. The pixel spatial light modulator is optically coupled to process light from the light source of the pixel and is configured to be electrically controllable with respect to at least one of beam shape or beam distribution of light from the pixel light source.

Some examples of apparatus as disclosed herein include a light generation and distribution system and a programmable controller. For such an example, the light generation and distribution system is configurable at a pixel level with respect to output parameters related to (1) light intensity, (2) light color characteristic and (3) spatial modulation. The programmable controller in some of these examples is coupled to the light generation and distribution system to set the light output parameters in accordance with data processed by the programmable controller.

An example of a lighting device disclosed herein includes a controllable light generation and spatial light distribution system, a driver, a memory with programming and a processor. The driver is coupled to the controllable system to control light generated by the system and to control a spatial distribution of the generated light. The processor has access to the memory and is coupled to the driver to control operation of the driver. The processor when executing the programming in the memory configures the lighting device to perform functions. The functions include obtaining an image selection of a luminaire and a general lighting distribution selection as software control data from a configuration file; presenting an image output, based on the image selection; and emitting light for general illumination having the selected light distribution. The selected light distribution may be a custom light distribution disassociated from the selected luminaire image.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 6B is a functional diagram of an example of a time division multiplexing implementation of display and lighting functions.

FIGS. 7A-7C are cross-section views of two pixels.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a lighting platform that enables virtual luminaires and light distributions to be created in software, for example, while offering the performance and aesthetic characteristics of a catalogue luminaire or whatever distribution and aesthetic appearance a designer may envision.

A software configurable lighting device, installed for example as a panel, offers the capability to appear like and emulate a variety of different lighting devices. Emulation may include the appearance of the lighting device as installed in the wall or ceiling, possibly both when and when not providing lighting, as well as light output distribution, e.g. direction and/or beam shape. Multiple panels may be installed in a room. These panels may be networked together to form one display. In addition, this network of panels will allow appropriate configurable lighting in the room.

Figure 1:
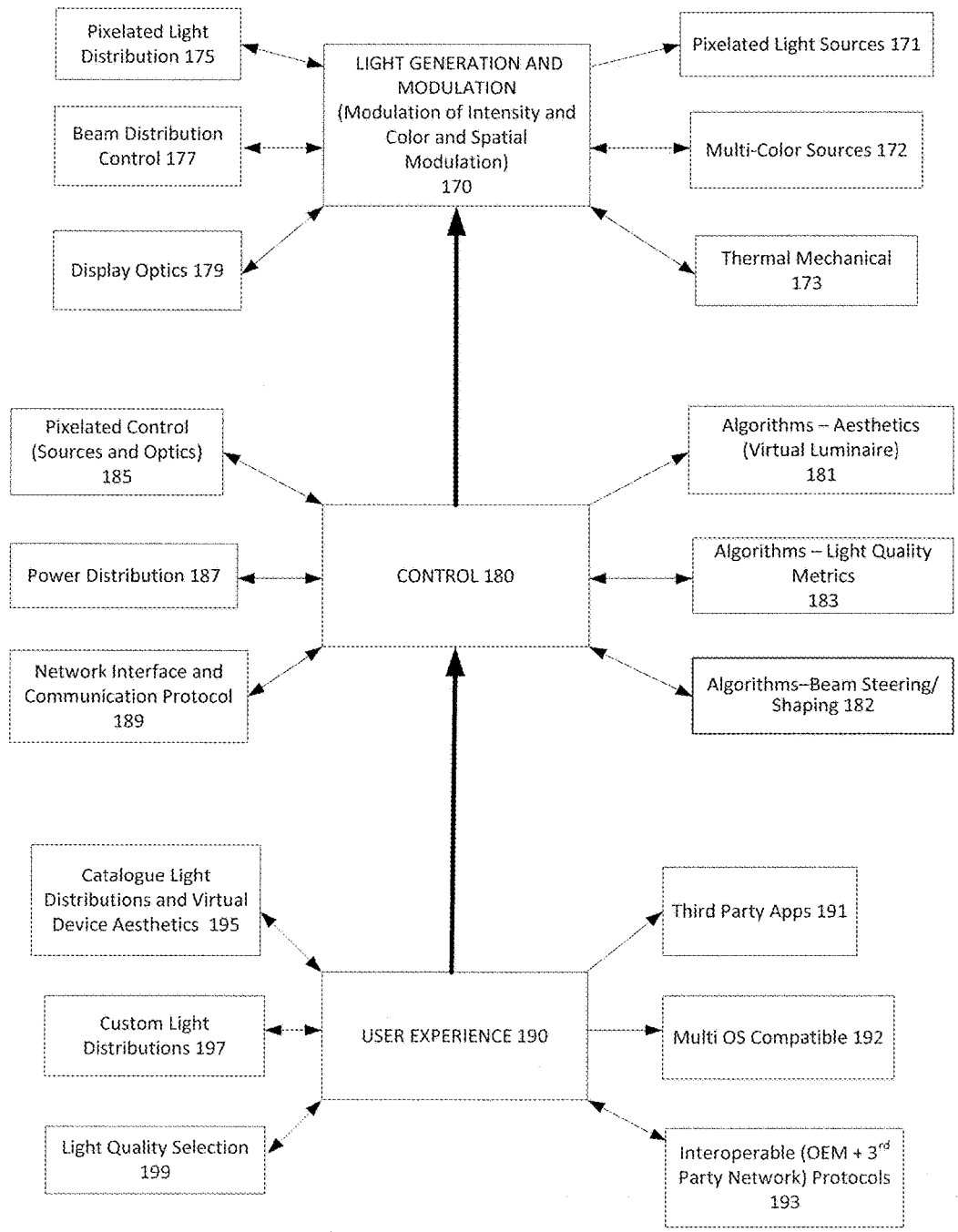
FIG. 1 is a block diagram of aspects of a system for providing software configurable appearance and illumination light output distribution through a lighting device.

Reference now is made in detail to the examples illustrated in the accompanying drawings and discussed below. FIG. 1 illustrates aspects of a system for providing software configurable appearance and illumination light output distribution through a lighting device. Many of the functions depicted in FIG. 1 are implemented in the software configurable lighting device 100, but some of the functions may be implemented on other intelligent devices in communication with the lighting device 100. For convenience, the functions are categorized in three layers, light generation and modulation 170, control 180 and user experience 190.

In the example, light generation and modulation 170 includes modulation of intensity and color as well as spatial modulation. These aspects of the system are typically implemented in the lighting device 100. As shown to the right, the light generation may utilize pixelated light sources 171 and/or multi-color light sources 172. The sources may be controlled with respect to intensity and color, at each source pixel. The source control therefore supports both intensity modulation and color modulation, which will be used in image output as well as configurable illumination output of the lighting device. The pixelated source layer functions also include thermal and mechanical design considerations 173, to insure heat dissipation from the sources and mechanical configuration of the lighting device for its intended purpose, e.g. as a wall or ceiling mounted luminaire.

As shown to the left in the example illustrated in FIG. 1, at the light generation and modulation layer 170, system functions also include pixelated light distribution 175 that is controllable at a pixel level. Beam distribution control 177, for example, may entail variable focusing or beam width limitation or other forms of controllable beam shaping. This layer also includes pixel level controllable optical beam steering, in the example. Depending on the particular implementation, the lighting device may also have passive or controllable display optics 179 to support aspects of the display functionality of the lighting device.

The optical pixel size for the optical control functions for spatial modulation (e.g., pixelated light distribution 175 and/or beam distribution control 177) may be the same as or different from the pixel size of the light sources (described in more detail in other examples). For example, each spatial modulation pixel may process light from an optically coupled one of the light source pixels, or one spatial modulation pixel may process light from two or more light source pixels or vice versa.

The control layer functions 180 interact with and control the light generation and modulation layer 170, although the control layer functions 180 may control other aspects of device operation as well, e.g. power and communications. In the example of FIG. 1, the control layer functions 180 include pixelated control 185 of the sources as well as for the optics for the spatial modulation. The control layer functions include control of distribution of power 187 to the sources and controllable optical elements as well as interface and control of network communications 189. As shown in the example, the control layer functions 180 also may include one or more applicable algorithms 181-183, for example, to implement desired aesthetics 181 for any selected virtual luminaire configuration as well as for beam steering and/or shaping 182 to implement any selected illumination light output distribution. Control layer 180 functions may also enable enhanced display capabilities. The control layer 180 functions also may include one or more algorithms 183 to establish, monitor and maintain performance with respect to light output quality metrics, e.g. intensity and color characteristic(s) of the selected illumination light output. At least some aspects of these control layer functions would likely reside in the lighting device itself, although some or all of these control functions may be responsive to commands from or reside in other equipment that is in communication with the software configurable lighting device.

The user experience layer 190, in the example, interacts with the control layer 180. Although user interface components and associated programming may reside in the lighting device 100, at least some of the user interface elements often reside elsewhere but communicate with the control layer aspects 180 of the lighting device 100. The example of a user experience layer includes a catalogue of light distributions and device aesthetics 195 and custom light 197 distributions. The device aesthetics and light distributions 195 contain the configuration data to define the appearance of the virtual device, such as a troffer, a sconce, a recessed light, or the like) and the spatial modulation, e.g. beam shaping and/or steering, for selected illumination light output characteristics. The virtual device selected by a user from the catalogue 195 includes an appearance of a lighting device. For a typical luminaire-like appearance, the selection from the catalogue 195 might specify an image of a particular lighting device (analogous to an image of a physical lighting device). The virtual device selected by a user from the catalogue 195 also includes a spatial lighting distribution for a selected virtual device. The appearance and distribution may be selected together, e.g. to present a luminaire appearance as well as a distribution corresponding to the selected luminaire appearance. For example, a recessed light may have a light distribution that is predetermined by the physical dimensions and structure of a recessed light; and a virtual version of such a device would appear like the recessed light and distribute the illumination light output of in a manner similar to the physical version of the recessed light. Alternatively, the catalogue may allow the user to select the appearance of one lighting device and an optical output performance (e.g. intensity, color characteristic and/or distribution) of a different lighting device. However, since the described system 100 provides virtual lighting devices, a user may select from among custom light distributions 197, e.g. not corresponding to any particular device. Another option is to select or design a light distribution, via the user experience 190, for the selected virtual device that is different from the typical light distribution of a physical device. Continuing with the example of a recessed light, the user may want the virtual device to look like the recessed light, but output a light distribution of an overhead fluorescent lamp. The presented image, however, may not even appear like a lighting device, per se. Hence, the presented appearance of the selected luminaire on the described configurable lighting device may be disassociated from the performance parameters of the light distributed by the lighting device. In other words, the output light distribution from the device presenting the image of the selected appearance does not have to conform to the physical constraints of the selected appearance.

In addition to providing a catalogue 195 or custom light distributions 197, the catalogue 195 and custom light distributions 197 may include selections that allow images and/or light distributions to be calculated using, for example, chaotic, time-based chaotic or Fourier-based algorithms, such as those described in commonly-assigned U.S. patent application Ser. Nos. 14/603,884, 14/303,643, 13/594,206, and 13/594,236. In other words, the selected images and/or selected light distribution is calculated using one or more algorithms executed by a processor, such as processor 123 or a remote processor accessible via communications interface 117. Algorithms may receive user inputs as parameters, such as parameters related to the tasks to be performed in a space, the structure and layout of a space, the emotion of a person that will be using the space, and the like.

The user experience layer 190 also includes light quality selection(s) 199. The combination of a selected light distribution from 195 or 197 and a set of characteristics from 199 for a given light quality correspond to a selected overall illumination light output performance, e.g. the illumination corresponding to a selected type of virtual luminaire. Hence, each selected device 'configuration' in this example may include a selected virtual luminaire design and a selection of a distribution and/or a light quality selection, e.g. to cause the lighting device 100 to provide the aesthetic appearance and illumination light output performance of a selected virtual luminaire design.

These virtual luminaire related selections may be made via another device and stored in the lighting device or input directly via a user interface on the lighting device 100. The lighting device 100 will store the currently applied light distribution and quality selections to implement a virtual luminaire with a selected light distribution, although the device may store two or more of each type of selection to allow a user to select from previously stored settings for some number of virtual luminaires. As mentioned above, instead of storing current light distribution, light quality or luminaire images, these elements may be calculated when the lighting device is turned ON for use.

The example of FIG. 1 also offers a high degree of compatibility with other technologies. Hence, the user experience layer 190 shown in that drawing also supports third party applications, which may run on the lighting device and/or user devices in communication with the lighting device. For example, interoperability with OEM protocols and/or third party network protocols is achieved via algorithms and routines provided by interoperable protocols 193.

The applications, for example, allow the user to select configurations for the device and have them installed in the device, select amongst multiple virtual luminaire configurations that may be installed in the device at any given time, and control operations of the device while in a selected virtual luminaire configuration (e.g. dim or adjust color of the illumination light output of the virtual luminaire). A third party application may also support a variety of ancillary functions if offered via the device, e.g. monitoring device performance, monitoring data of any included sensors, communication or control of other on-premises equipment etc.

The device configurations for virtual luminaires may be agnostic with respect to underlying software or protocols via, for example, interoperable protocols 193. Hence, in the example, an overall system will support multiple software or firmware operating systems (OS) that may be implemented on various user devices and possibly even in different instances of software configurable lighting devices. The illustrated example of the overall system also is interoperable with protocols of equipment of various other entities, such as the original equipment manufacturer (OEM) and third party networks such as those of various providers of services to or through the lighting devices.

Figure 2:
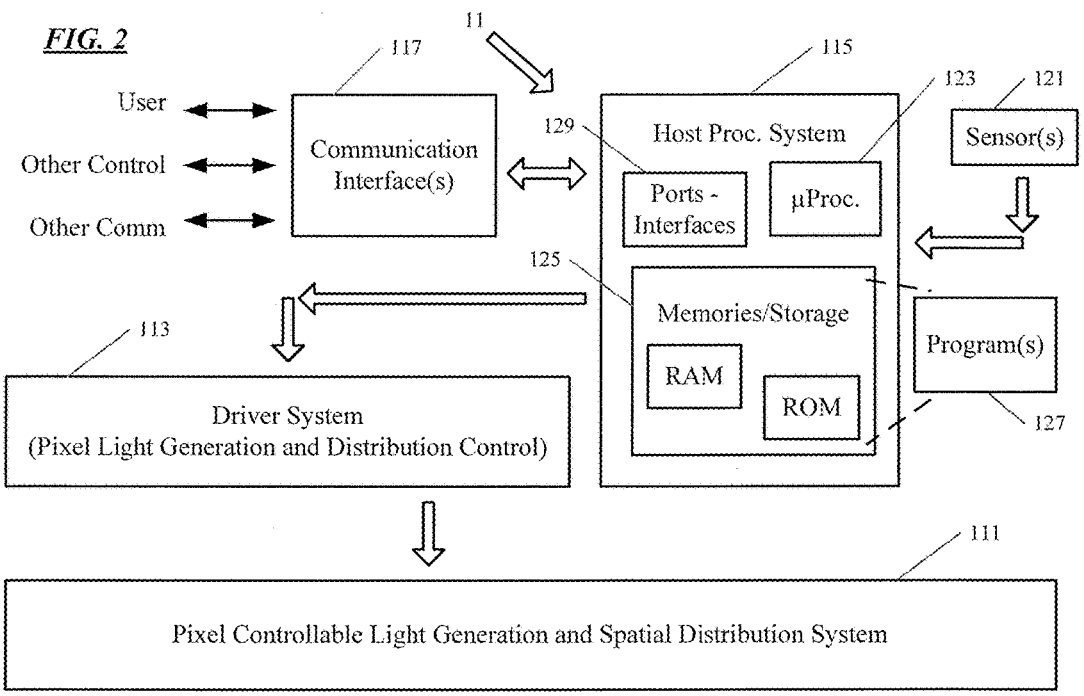
FIG. 2 is a high-level functional block diagram of a software configurable lighting apparatus.

FIG. 2 depicts an example of a lighting device 11, including high layer logic and communications elements, a pixel controllable light generation and spatial light distribution (spatial modulation) system 111 configured to simultaneously provide general illumination and display functionalities and one or more drivers (shown as a system) 113.

As shown in FIG. 2, the lighting device 11 includes a pixel controllable light generation and pixel controllable spatial light distribution system 111, a driver system 113, a host processing system 115, one or more sensors 121 and one or more communication interface(s) 117. Apparatuses implementing functions like those of device 11 may take other forms. In some examples, some components attributed to the lighting device may be separated from the pixel controllable light generation and spatial distribution system 111. For example, an apparatus may have all of the above hardware components on a single hardware device as shown or in different somewhat separate units. In a particular example, one set of the hardware components may be separated from system 111, such as the host processing system 115 and may run several systems, such as the driver system 113 from a remote location. Also, one set of intelligent components, such as the microprocessor 123, may control/drive some number of driver systems 113 and/or light generation and distribution systems 111 via one or more of the ports and/or interfaces 129.

In an example, the processor 123 receives via one or more of communication interfaces 117 a configuration file that indicates a user selection of a virtual luminaire appearance and a light distribution to be provided by device 11. The processor 123 may store the received configuration file in memories/storage 125. Each configuration file includes software control data to set the light output parameters of the software configurable lighting device with respect to light intensity, light color characteristic and spatial modulation. The respective light output parameters set the output for the image display and general lighting distribution. The processor 123 by accessing programming 127 and using software control data in the memory 125 controls operation of the driver system 113 and other operations of the lighting device 11. For example, the processor 123 obtains an image selection of a luminaire and a general lighting distribution selection as software control data from a configuration file. Using the software control data, the processor 123 controls the driver system 113 to present, via the controllable system 111, an image output based on the image selection. The processor 123 also controls the driver system 113, based on the software control data, to emit light for general illumination having the selected light distribution. The selected light distribution may be a custom light distribution disassociated from the selected appearance image or may be a light distribution commonly associated with a selected luminaire.

The controllable system 111 includes controllable light source(s) and spatial modulators. At this time it may be appropriate to explain some of the terms that will be frequently referenced throughout the discussion of examples. For example, the light sources in the controllable system are arranged as a matrix of pixel light sources. A pixel light source electrically controllable with respect to one or more light output parameters comprising light intensity or light color characteristic. In some examples, each of the pixel light sources are individually controllable in response to control signals from the driver system 113.

The source may use a single light generator and an intermediate pixel level control mechanism. For example, the light generator may be a backlight system, and the pixel level control of intensity and color characteristics may be implemented with an liquid crystal display (LCD) type pixel matrix. The backlight may utilize one or more emitters and a waveguide or other distributor to supply light to the controllable pixels of the LCD matrix. As another example, the lighting device may use a source similar to a projection TV system, e.g. with a modulated light generation device or system and a digital micro-mirror (DMD) to distribute light modulated with respect to intensity and color characteristic across the projection surface. In the projection example, the source pixels are pixels formed on the projection surface. Other examples below utilize individual source pixels that directly incorporate light emitters within each controllable source pixel.

The spatial modulators utilize components usable to provide the light distribution modulation functions 175-177 of FIG. 1. Techniques for spatial light modulation include the use of electrically controllable optical properties such as refraction, reflection, diffraction, scattering, etc. or combinations of such properties. The spatial modulators may incorporate one or more technologies such as micro/nano-electro-mechanical systems (MEMS/NEMS) based dynamic optical beam control that may be active control using one or more controllable lensing, reflectors and mirrors; electrowetting based dynamic optical beam control; microlens based passive beam control; passive control using segment control (X-Y area and pixels), holographic films, and/or LCD materials. Of course, these modulation technologies are given by way of non-limiting examples, and other modulation techniques may be used. Other techniques, such as 3 dimensional (3D) techniques, may be utilized to provide enhanced image display and general illumination distributions. It is envisioned that different display image presentation techniques that allow viewers in different locations of a space may view a lighting device and see different attributes of the lighting device. For example, a view directly beneath the lighting device may only see in the displayed image the bezel surrounding a light source, such as a light bulb, of the selected image of a luminaire, while another viewer some distance away may see a side view image of the selected image of the luminaire. Examples of such displays and display techniques may be provided by Zebra Imaging of Austin, Tex., and Leia Inc. of Menlo Park, Calif.

The spatial modulators also may be arranged as a matrix of pixels in which a pixel spatial light modulator is optically coupled to process light from one or more pixels of the pixel light source. Each pixel spatial light modulator, for example, is configured to be electrically controllable with respect to at least one of beam shape or beam distribution (i.e. steering) of light from the pixel light source. In some of the examples, the individual pixel spatial modulators in the spatial modulator array are also individually controllable in response to control signals from the driver system 113. The number of pixel light sources in the light source matrix of pixels does not have to correspond to the number of pixel spatial modulators in the spatial modulator array of pixels. For example, the number of pixel light sources may be 790,000 and the number of pixel spatial modulators in the spatial modulator array of pixels may be 200000 (i.e., a ratio of 4 to 1). Alternatively, the light source matrix of pixels may be a single (i.e., one) light source that provides light to the spatial modulators. In other examples, the ratio of light source pixels to spatial modulator pixels may be 1:1, 1:4, 2:1, 1:2, 3:1 or some other ratio that provides desired functionality and features.

The spatial modulators (not shown in this example) are controllable at the individual pixel levels to control a spatial distribution of light generated by one or more pixel light sources. In some examples, a pixel includes both a light source pixel and a spatial modulation pixel. There can also be examples where a combination of pixel matrices may be combined for different image generation and general illumination purposes. Spatial distribution, also referred to as angular distribution, spatial modulation, and/or light distribution, refers to spatial characteristic(s) of the output of light from a lighting device.

Where there is a source pixel corresponding to each spatial modulator pixel, or each pixel includes both a controllable source and a spatial modulator each of the combination of the source and the spatial modulator may be thought of a one combined pixel. In such cases, the pixel spatial light modulator(s) of the controllable system 111 in some examples, is configured to process light from the light source of the pixel and is electrically controllable in response to commands from the processor with respect to at least one of beam shape or beam distribution of light from the pixel light source. For example, the processor 123 by accessing programming 127 in the memory 125 controls operation of the driver system 113 and other operations of the lighting device 11. In the examples, the processor 123 processes data retrieved from the memory 123 and/or other data storage, and responds to light output parameters in the retrieved data to control the light generation and distribution system 111. The light output parameters may include light intensity, light color characteristics, spatial modulation, spatial distribution and the like.

Spatial distribution is influenced by different control parameters related to the manner in which generated light leaves the spatial modulator pixel, such as the angle (also referred to as beam steering), a beam shape, time period, and the like. The generated light may also take the form of light for general illumination, such as task lighting, area lighting, focal point lighting (e.g., illuminating a painting on a wall or a niche), mood lighting, and the like, as well as image generation. Image generation may be the generation of a real-world scene, such as clouds, lighting device, objects, colored tiles, photographs, videos and the like, or computer-generated images, such as graphics and the like. In other examples, the image will be a representation of or include a representation (with surrounding other imagery) of a discernible lighting device. The lighting device image, for example, may depict a conventional fixture or type of actual luminaire.

Examples of different arrangements of the light source pixels and the spatial modulator pixels are described in more detail with reference to FIGS. 4-16C. For example, a light source pixel in the matrix of light source pixels includes at least one pixel light source. In other examples, a pixel may be an integrated pixel that includes at least one pixel light source and at least one pixel spatial light modulator, and that is responsive to integrated controls.

Examples of a pixel light source include planar light emitting diodes (LEDs) of different colors; a micro LED; organic LEDs of different colors; pixels of an organic LED display; LEDs of different colors on gallium nitride (GaN) substrates; nanowire or nanorod LEDs of different colors; photo pumped quantum dot (QD) LEDs of different colors; plasmonic LEDs of different colors; pixels of a plasma display; laser diodes of different colors; micro LEDs of different colors; resonant-cavity (RC) LEDs of different colors; Super luminescent Diodes (SLD) of different colors, and photonic crystal LEDs of different colors. In addition to typical cellular plasma arrays used in televisions or monitors, plasma display technologies may include: plasma tube array (PTA) display technology from Shinoda Plasma Co., Ltd. or a plasma spherical array by Imaging Systems Technology (IST) in Toledo, Ohio. As will be described in more detail with reference to FIGS. 5-11C, examples of a pixel spatial light modulators are configured to process light from the light source of the pixel and are electrically controllable with respect to at least one of beam shape or beam distribution of light from the pixel light source.

For convenience, the description of examples most often describes the chosen image or the like as a representation of one luminaire, fixture or lighting device. A single software configurable lighting device 11, however, may present representations of one, two or more luminaires or lighting devices in one display. Regardless of the selected image, sets of performance parameters may approximate output of one, two or more luminaires. Also, the selection of a luminaire representation often may include a selection of a representation for appearance around or on other parts of the device output surface. For example, consider a selection of an appearance similar to a 6-inch circular downlight type physical luminaire. The output of the software configurable lighting device 11 often is larger, e.g. 2-feet by 2-feet (2×2). In such a case, the user can select where on the 2×2 output of device 11 the representation of the selected downlight should be displayed as well as the appearance of the rest of the output (where device 11 is not showing the downlight image). The user, for a ceiling mounted example, may choose for the device 11 to display a representation of a common ceiling tile around the downlight, and if so, select features such as color and texture of the displayed tile.

In addition, the device 11 is not size restricted. For example, each device 11 may be of a standard size, e.g., 2-feet by 2-feet (2×2), 2-feet by 4-feet (2×4), or the like, and arranged like tiles for larger area coverage. Alternatively, the device 11 may be a larger area device that covers a wall, a part of a wall, part of a ceiling, an entire ceiling, or some combination of portions or all of a ceiling and wall.

Also, the examples focus on presentation and illumination performance when device 11 is emitting illumination light, i.e. as if the virtual luminaire is turned ON. However, the software configurable lighting device 11 can provide a different output for the virtual luminaire in the OFF state. For example, the device 11 may display a representation of a selected virtual luminaire in an OFF state (e.g., a darkened luminaire) and any selected surrounding area in a lower light state similar to when a physical lighting device is OFF. Other OFF state options can be implemented on device 11 via configuration information. For example, the configurable device may output any desired image or a sequence of images or video for presentation when the virtual luminaire is to be OFF. As just a few such examples, the output may represent a blank ceiling tile (as if virtual luminaire disappeared), a selected photograph, a selected image of an artwork or even a video.

The host processing system 115 provides the high level logic or "brain" of the device 11. In the example, the host processing system 115 includes data storage/memories 125, such as a random access memory and/or a read-only memory, as well as programs 127 stored in one or more of the data storage/memories 125. The host processing system 115 also includes a central processing unit (CPU), shown by way of example as a microprocessor (µP) 123, although other processor hardware may serve as the CPU.

The host processing system 115 is coupled to the communication interface(s) 117. In the example, the communication interface(s) 117 offer a user interface function or communication with hardware elements providing a user interface for the device 11. The communication interface(s) 117 may communicate with other control elements, for example, a host computer of a building and control automation system (BCS). The communication interface(s) 117 may also support device communication with a variety of other systems of other parties, e.g. the device manufacturer for maintenance or an on-line server for downloading of virtual luminaire configuration data.

The host processing system 115 also is coupled to the driver system 113. The driver system 113, which may be referred to as the pixel light generation and distribution control system. The driver system, or driver, 113 is coupled to the pixel controllable light generation and spatial distribution system (e.g., "controllable system") 111 to control at a pixel level light generation by the controllable system 111. The driver 113 also controls the pixel level spatial distribution of the generated light.

Figure 3:
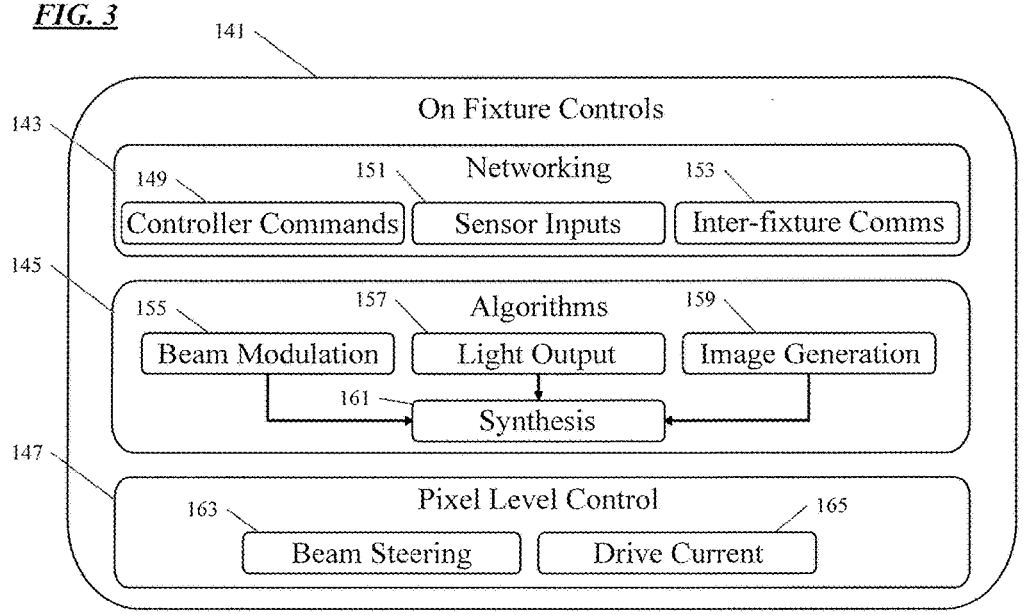
FIG. 3 is a high-level diagram of the control functions that may be implemented in a software configurable lighting apparatus, like that of FIG. 2.

The host processing system 115 and the driver system 113 provide a number of control functions for controlling operation of the lighting device 11. FIG. 3 is a high-level diagram of the control functions that may be implemented in a software configurable lighting device, like that of FIG. 2. For example, the On Fixture Controls 141 of the host processing system 115 and the driver system 113 encompass three functional areas of networking 143, algorithms 145 and pixel level control 147. Different aspects of each of the three functional areas may overlap into other functional areas, for example, some of the pixel level control 147 may be implemented at, or limited at, the networking 143 functional area. But for the ease of explanation, it will be presumed that the different functions are distinct and confined to the respective functional area.

The networking functional area 143 includes controller commands 149, sensor inputs 151 and inter-fixture communications (i.e., "comms") 153. The inter-fixture comms 153 accommodates communications with controllers, such as microprocessor 123, sensor(s) 121, and/or other fixtures/devices. The processor 123 may parse commands in order to provide appropriate inputs to algorithms of the algorithms functional area 145.

The algorithms functional area 145 includes beam modulation 155, light output 157, and image generation 159, all of which are inputs into a synthesis function 161. For example, the beam modulation 157 algorithm may facilitate calculation of control settings for elements of the controllable system 111. The light output 157 algorithm may facilitate calculation of drive current settings to be generated by the driver system 113 for each pixel to achieve a desired overall light output. For example, the desired light output may have a desired correlated color temperature (CCT), intensity, and quality, such as color rendering index (CRI), R9 color rating or the like. The image generation 159 algorithms are used to calculate pixel settings to generate an image. The beam shape, light quality and image generation algorithms provide respective output parameter values to the synthesis function 161 algorithms. The synthesis function 161 algorithms use the respective output parameter values of the beam shape, light quality and image generation algorithms to produce the desired overall fixture settings of the lighting device 11. The synthesis function 161 algorithms may utilize time division multiplexing or the like, and may account for time or event based parameter values to implement certain effects, such as fading, contrast enhancement, image blurring or the like.

The pixel level control functional area 147 includes beam steering 163 and drive current 165 functions. For example, the beam steering function 163 may allow independent control over individual beam steering elements, and controls may include X, Y or angular directional spatial distribution and/or focus adjustments for each element. Examples of the directional spatial distribution and focus adjustments are discussed in more detail with reference to FIGS. 7A and 7B. Alternatively or in addition, the pixel level control functional area 147 may also control spatial multiplexing of image display and general illumination distribution light output from respective lighting devices. Spatial multiplexing allows a first set of pixels in a lighting device to be controlled to provide a selected image display while a second set of pixels may be controlled to provide a selected general illumination distribution. Similarly, area sharing enables simultaneous generation of light from different areas of the controllable system 111 to generate light for the image display function and the general illumination distribution function respectively. The respective sets of pixels, in response to control signals from a processor, may output light for a selected image display or a selected general illumination distribution.

In some examples (not shown), different configurations of pixel matrices, such as those having different sizes and different numbers of pixels, for the light sources as well as the spatial modulators may be used. The on fixture controls 141 of FIG. 3 as executed by the host processing system 115 and the driver system 113 provide a control function to the controllable system 111. As mentioned above, the controllable system 111 in some examples includes pixel level control at both the light source pixel level and at the spatial modulation level. For example, a first controller may provide light source driver signals while a second controller may provide spatial modulation driver signals, and the first and second controllers are different from one another.

Figure 4:
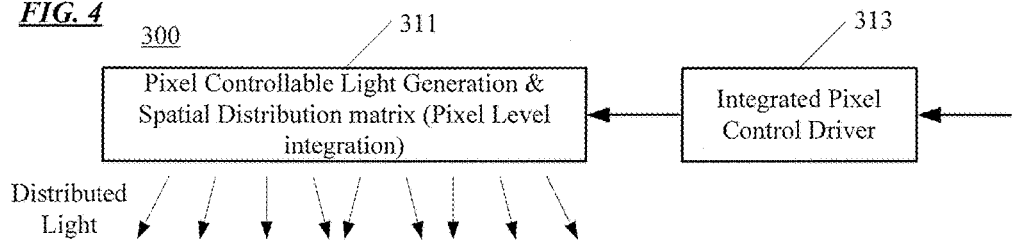
FIG. 4 is a block diagram of an example of the pixel controllable light generation and spatial light distribution system, with pixel level integration of the generation and distribution functions, and illustrating the associated driver.

The control functionality shown is FIG. 3 will now be discussed in more detail with reference to FIG. 4. FIG. 4 is a block diagram of an example of the pixel controllable light generation and spatial light distribution system 300. In the example of FIG. 4, the spatial modulation component is integrated with light sources within the pixel elements of the matrix in the pixel controllable light generation and spatial distribution matrix 311. In other words, the lighting device 11 has pixel level integration of light generation and spatial distribution capabilities and functions in a pixel controllable light generation and spatial distribution 311. The light generation and spatial distribution components and functions may be integrated at board or chip level. For example, both display functions and beam steering capabilities may be integrated on-chip. As a result, in an example, the driver system 113 may also be integrated into the pixel controllable light generation and spatial distribution 311. In such an implementation, the integrated pixel control driver 313 is an integrated controller providing matrix drive signals for image generation and spatial light modulation. The integrated pixel control driver 313 may receive signals from an external source such as the host processor system of FIG. 2 or the like. The integrated pixel control driver 313 is coupled to processor, such as a host processing system 115, and receives commands based on image selections and/or spatial distribution selections from the microprocessor 123. In such an implementation as shown in FIG. 4, the pixel controllable light generation and spatial distribution matrix 311 responds to control signals received from the integrated pixel control driver 313 to generate distributed light. The generated distributed light presenting an image and a selected light distribution. In an example, the integrated pixel control driver 313 receives commands for driving the pixel controllable light generation and spatial distribution matrix 311 based on image selections from a controller, such as microprocessor 123 of FIG. 1. A selected image, for example, may correspond to a displayable representation of a selected lighting device or any image. The selected lighting device image may be an actual physical lighting device or an artist's/engineer's design for a lighting device that may not exist in the physical world. Similarly, the selected image may be an image of a real scene or a computer generated image.

An approach to developing a configurable luminaire might utilize a display as the light source, e.g. with enhancements to improve illumination performance. For example in the system 300, an LCD type display device with a backlight type light generation source, for example, might be improved by modifications of the light generation source. The source might be modified/supplemented to increase the intensity of available light. For example, the number of light sources, whether using known types of back-lighting lamps or direct-lighting LEDs including organic LEDs (OLEDs), can be increased to increase the light output from the configurable luminaire when providing general illumination. Also, modifications may be made to the components or layers of the LCD type display device to increase the light output efficiency of LCD-type display. For example, the diffuser and/or polarizers used in a typical LCD-type display may be replaced with switchable diffusers and/or polarizers that enable the light output from the LCD-type display to be used for general illumination.

Other approaches are also envisioned, for example, the various techniques for increasing the intensity of available light output from plasma sources, such as modifying the electrode design, modifying cell shape and/or volume, changing the gas mixture or replacing the phosphor of cells may be used to provide suitable general illumination.

Another display enhancement might provide broader/smoother spectrum white light from the backlight type light generation source (e.g. instead of a source that provides fairly intense red, green and blue spikes in the spectrum of generated light). With such source enhancements, a driver, such as driver 313, might control the LCD elements, such as the switchable diffuser and/or polarizers, of the display in the pixel controllable light generation array 311 to generate an image of a light fixture or the like, with high intensity and/or high quality white light output in regions of the image corresponding to the distributed light output of the represented light fixture. Other areas of the displayed image might represent typical examples of material(s) around the fixture, e.g. a portion of a ceiling tile. Another lighting approach might use time division multiplexed control of the backlight type light generation source, for example, to provide appropriate intensity and/or color of light for image display in a first period of a recurring cycle for image display and a high intensity and/or high quality white light output in another period of each recurring cycle when the enhanced display, such as system 300, is to generate and output light for the illumination function.

The above-mentioned display enhancements may also be provided using a simpler mechanical approach that utilizes interchangeable films/diffusers/translucent sheets that are mechanically inserted and removed from in front of one of the above examples of an enhanced display. The interchangeable films/diffusers/translucent sheets may provide spatial modulation effects based on the selected general illumination distribution, or to provide an image effect on a displayed virtual luminaire image. For example, a system of rollers (not shown) may be used to move the interchangeable films/diffusers/translucent sheets to provide the selected lighting distribution or image effect.

In another example, the pixel controllable light generation and spatial modulation matrix 311 of FIG. 4 may be configured as an enhanced display having a light generation source for providing a selected image effect surrounded by another light generation source that provides light that is processed, for example, via spatial modulation, to provide a selected lighting distribution. For example, a lighting device may have a first light generation array that provides an image display with a bezel having a second light generation array that provides general illumination.

Figure 5A:
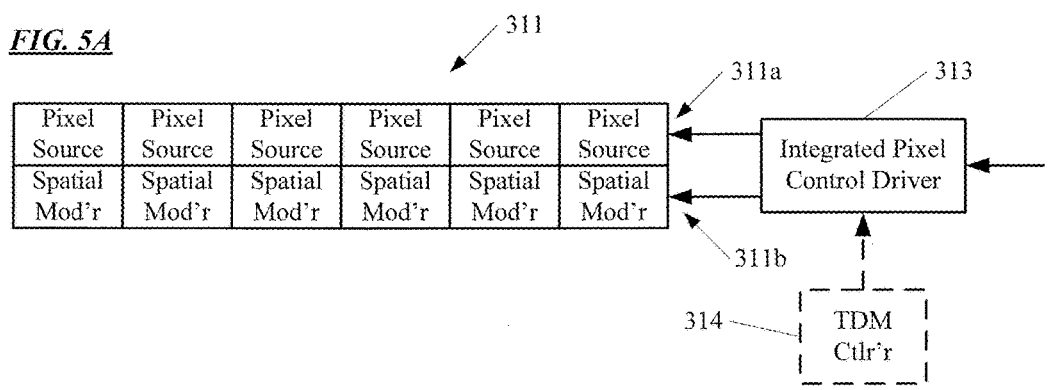
FIG. 5A is a somewhat more detailed illustration of an example of the pixel controllable light generation and spatial light distribution system and the associated driver.
Figure 5B:
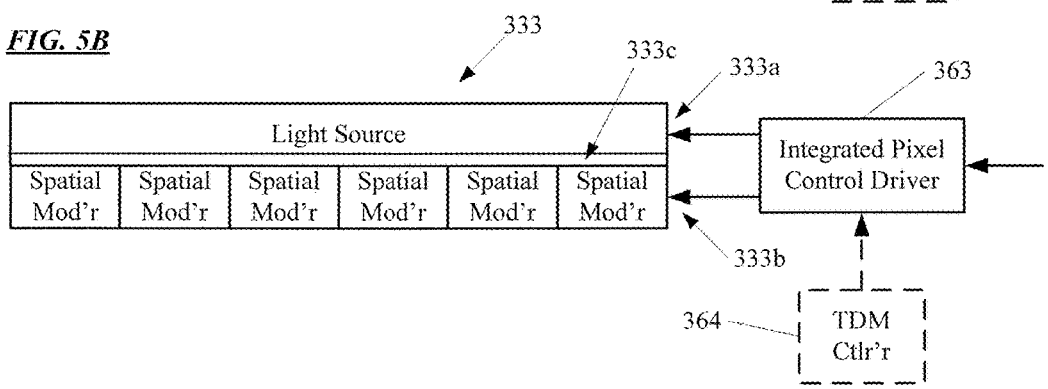
FIG. 5B is another example of a somewhat more detailed illustration of an example of the pixel controllable light generation and spatial light distribution system and the associated driver.

FIG. 5A is a somewhat more detailed illustration of an example of the pixel controllable light generation and spatial light distribution system and the associated driver. In the illustrated example of FIG. 5A, the pixel controllable light generation and spatial distribution matrix 311 is divided into two separate pixel matrices 311*a* and 311*b*. As shown in the example of FIGS. 5A and 5B, the respective pixel matrices 311*a* and 311*b* are shown with the same pixel size/numbers for both individual pixel light sources and the individual spatial modulators. Of course, other examples (such as in FIG. 6B) may have different pixel matrix (different size and number) for the respective light source matrix and spatial modulators matrix. The example of FIG. 5A is similar to the example of FIG. 4 in that control signals are provided by the integrated pixel control driver 313, however, in the example of FIG. 5A, control signals are provided to each of the respective matrices 311*a* and 311*b*. The integrated pixel control driver 313 of FIG. 5A provides image display control signals to the pixel light sources in the pixel light source matrix 311*a* and general illumination distribution control signals to the spatial modulator pixel array 311*b*. For example, the pixel light source of the controllable system 311 is electrically controllable via the driver 313 with respect to light output parameters, such as light intensity and light color characteristics. Light color characteristics, for example, include different proportions of various light from each sub-pixel light source, such as red, green, blue and/or white light emitting diodes, as well as grayscale and/or monochromatic lighting effects.

The integrated pixel control driver 313, in some examples, in addition to receiving inputs from a host processor may also receive time division multiplexing (TDM) signals from a TDM controller 314. The TDM controller 314 may include timing signals that control the output the display of images and the provision of general illumination by the pixel controllable light generation and spatial distribution matrix 311. The TDM timing signals will be described in more detail with reference to FIGS. 6A and 6B.

FIG. 5B is another example of a somewhat more detailed illustration of an example of the pixel controllable light generation and spatial light distribution system and the associated driver. In the illustrated example of FIG. 5B, the pixel controllable light generation and spatial distribution matrix 333 is divided into two separate components 333*a*, 333*b* and 333*c*. As shown in the example of FIG. 5B, components 333*a* and 333*c* operate in cooperation to provide light to the pixel spatial modulation matrix 333*b*. As shown, a single (i.e., one (1)) light source 333*a* supplies light while color filters 333*c* provide image display as well as general illumination lighting to the individual spatial modulator 333*b*. The color filters 333*c* may include a number of different color filters that enable the single light source 333*a* to be used to generate both an image display and a general lighting distribution. Alternatively, the spatial modulators pixels of the spatial modulator matrix 333*b* may include the color filters 333*c* as well as the beam shaping and beam distribution for providing the image output as well as the general lighting distribution. The example of FIG. 5B is similar to the example of FIG. 5A in that control signals are provided by the integrated pixel control driver 363. The integrated pixel control driver 363 of FIG. 5B provides image display control signals to the single light source 333*a* and general illumination distribution control signals to the spatial modulator pixel array 333*b*. The light source 333*a* may be driven by the integrated pixel control driver 363 to generate light having characteristics, such as light intensity, for generating the image output and the general lighting distribution. In addition, the color filters 333*c* are also electrically controllable via the driver 363 with respect to light output parameters, such as light color characteristics. Light color characteristics, for example, include different proportions of various light from each light source, such as red, green, blue and/or white light emitting diodes, as well as grayscale and/or monochromatic lighting effects.

The integrated pixel control driver 363, in some example, in addition to receiving inputs from a host processor may also receive time division multiplexing (TDM) signals from a TDM controller 364. The TDM controller 364 may include timing signals that control the output the display of images and the provision of general illumination by the pixel controllable light generation and spatial distribution matrix 333. The TDM timing signals will be described in more detail with reference to FIGS. 6A and 6B.

Figure 6A:
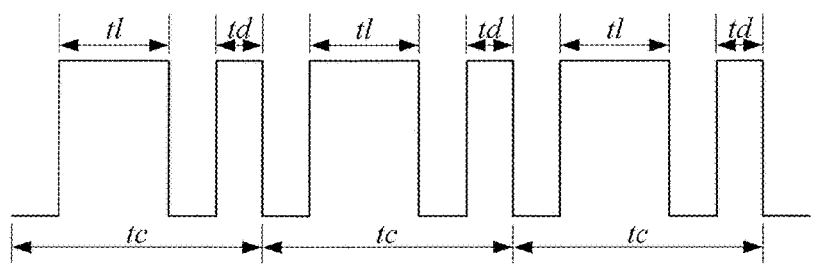
FIG. 6A is a timing diagram useful in understanding a time division multiplexing approached to the display and lighting functions.

FIG. 6A is a timing diagram useful in understanding a time division multiplexing approached to the display and lighting functions. The driver, controller or a processor may receive timing signals for controlling the respective display and lighting functions based on a timing diagram like the simplified illustration of FIG. 6A.

In this example, the timing diagram shows a time cycle tc that includes time durations related to the general illumination lighting time duration tl and the display presentation time period td. The example timing diagram may indicate timing for a specific general lighting duration and/or a particular type of image display, and is only an example. Other timing signals may be suitable depending upon different user selections and lighting conditions selected for a space or the like. The time cycle tc may be an arbitrary time duration. The time cycle tc is likely to be a duration that does not allow the transition from general illumination lighting during time period tl to presentation of the image display during period td to be discernible (e.g., as flicker, changes in contrast of objects in the room, or the like) by a person in the space. In addition, although the time durations tc, tl and td are shown as periodic, each of the respective time durations tc, tl and td may be aperiodic to enable different general illumination distributions and image displays. A more detailed example is provided with reference to FIG. 6B.

FIG. 6B is a functional diagram of an example of a time division multiplexing implementation of display and lighting functions. The lighting devices of FIGS. 2, 4 and 5 may be configured to function according to the example of FIG. 6B. The light sources, for example, are configured to have brightness and color characteristics suitable for providing image display capability, and also have a high dynamic range to also provide selected general illumination. In an example, a lighting device includes a controller, and a pixel controllable light generation and spatial distribution matrix (as shown in FIG. 2). The pixel controllable light generation and spatial distribution matrix includes a two dimensional light source array, as the source pixel matrix, and a two dimensional beam shaping array, as the spatial modulator pixel array. Each of the respective arrays includes pixels that are responsive to control commands from the controller provided via the row and column drivers of the driver system. The two dimensional light source array is a fast switching array of light sources (e.g., micro LEDS), and the two dimensional beam shaping array is an array of beam shaping optics, such as liquid crystal diffusing film or the like. In the example, the two dimensional light source array (i.e., pixel matrix) and a two dimensional beam shaping array type of pixel matrix do not have the same pixel resolution. In other words, the two dimensional light source array type of pixel matrix has a greater resolution, i.e., a greater number of pixels, than the two dimensional beam shaping array type of pixel matrix). In the upper right corner of the light source array, a section is shown as ON, which means light is being generated by the light sources in the ON area. The beam shaping array is transparent when an OFF signal is provided to the respective pixels in the beam shaping array. As shown in FIG. 6B, the upper right corner of the beam shaping array corresponding to the upper right corner light source array is OFF, or, in other words, transparent, which allows the generated light to viewable by a user in a space in which the lighting device in located. Conversely, in the bottom left corner of the source array, the source array is operating within the illumination lighting time duration, where all the source pixels are configured for high brightness. The corresponding beam shaping array pixels are configured in the ON state to shape and steer the beam appropriately for lighting.

In the example, the time division multiplexing timing signals illustrated in the time lines at the bottom of FIG. 6B. The time period $t_L$ corresponds to the part of the switching time cycle (e.g., $t_C$ of FIG. 6A) in which the light source array performs as a general lighting device, and the time period $t_D$ corresponds to the part of the switching time cycle when the light source array performs as an image display. In the illustrated example, the source pixel brightness signal applied by the controller at the left most time $t_L$ is maximum brightness. The controller based on the timing signals outputs a signal to the respective light source pixel column and row drivers to output a maximum light output in order that the lighting device may be used as a general illumination device. At the same left most time $t_L$, the timing signal for the beam shaping pixel transmittance in the bottom most timeline is at a low value that is interpreted by the controller to mean an OFF signal. In other words, the beam shaping array is to be transparent. In order for the beam shaping array to be transparent, the controller provides OFF control signals to the respective row and column drivers of the beam shaping array that correspond to the same pixels being controlled in the light source array. After left most time $t_L$ expires, time $t_D$ occurs and various display timing signals are provided and the respective pixel row and column drivers output control signals that drive the light sources at various intensity or brightness levels that enable an image to be displayed on the lighting device, until the left most time $t_L$ occurs. All or part of the light source pixels may simultaneously function as both display and lighting pixels based on the respective timing signals. Alternatively, particular light source pixels may function to only display images and other specific light source pixels may function to only provide general illumination. The foregoing discussion did not account for any beam shaping or beam steering control signals that may also be provided to the beam shaping array pixels, which may also be provided to the respective pixels of the beam shaping array. In addition to time division multiplexing and spatial multiplexing, lighting and display functions can be multiplexed in angle, wavelength, polarization, and combinations of one or more of all of these approaches.

Figure 7A:
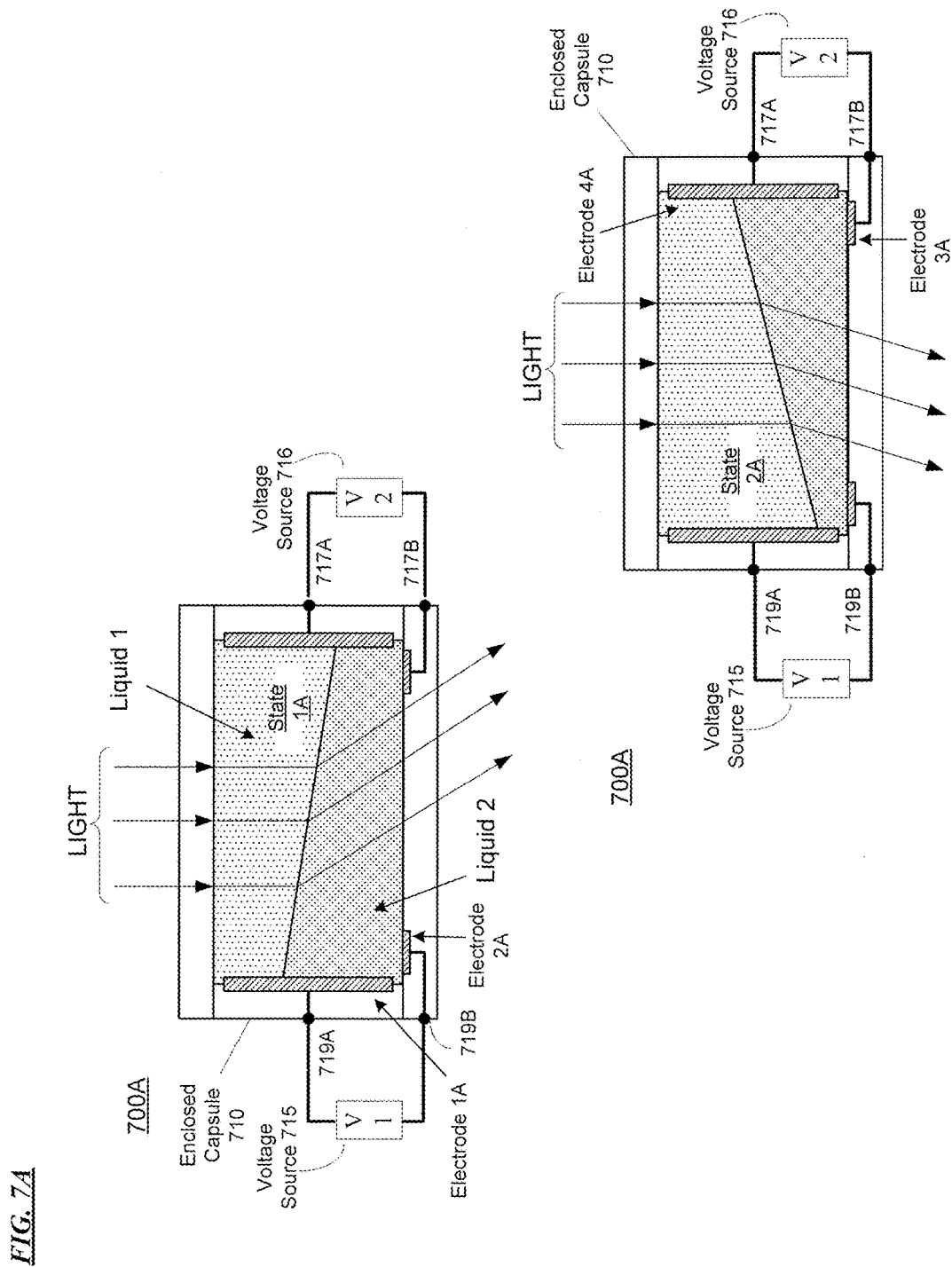
Figure 7B:
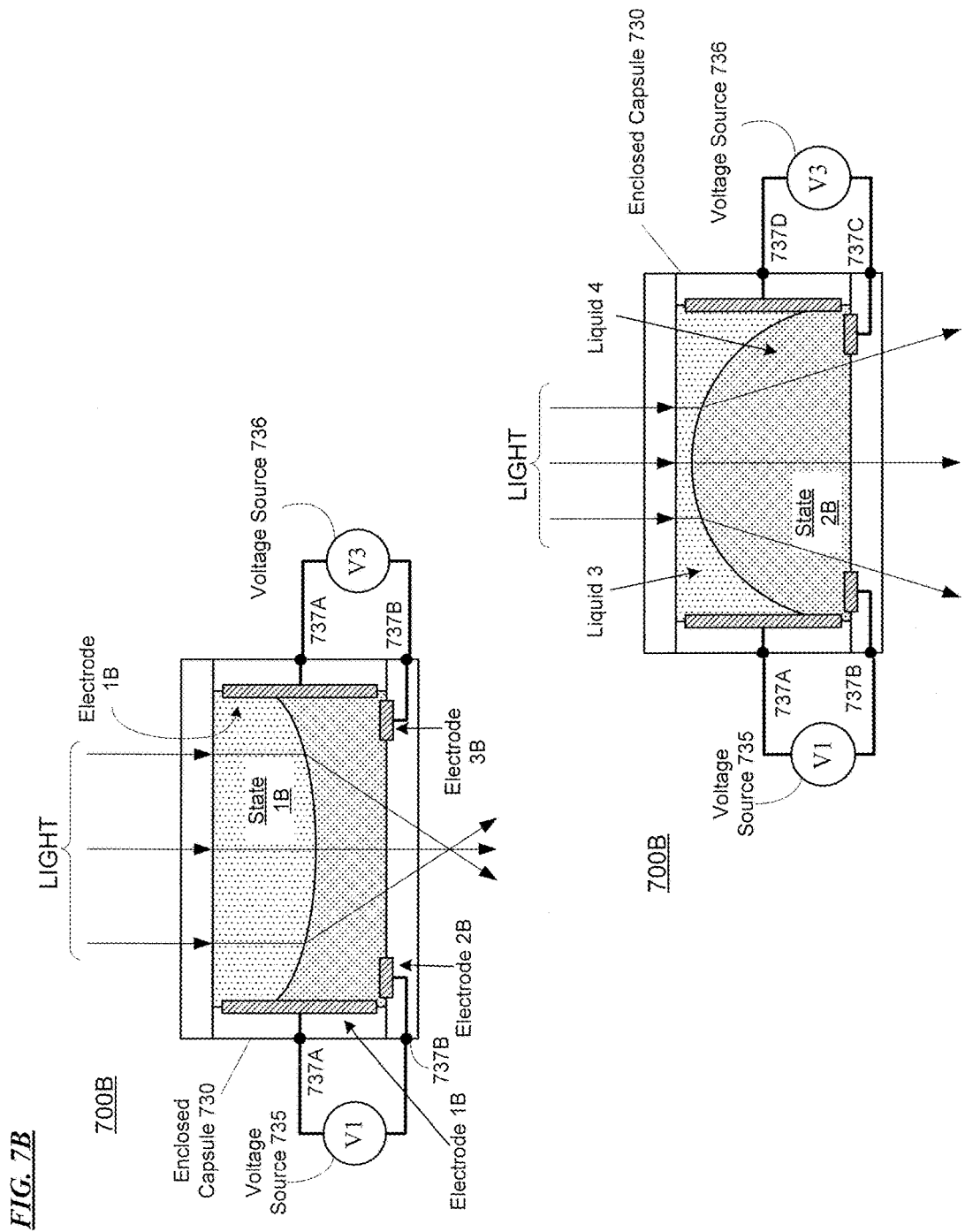

In some examples, each of the pixel spatial light modulators includes one or more electrically controllable liquid lens for beam steering or beam shaping or both. The electrically controllable liquid lens are controllable at the pixel level or the spatial modulator pixel array. As shown in FIGS. 7A and 7B, a respective pixel of the pixel spatial modulators is controllable in response to control voltages to process light from a light source. For example, the spatial modulator pixel 700A may process input light by deflecting (i.e., refracting) the inputted light, while the spatial modulator pixel 700B processes input light by shaping the beam of light. In other words, each spatial modulator pixel 700A or 700B may act as a lens that processes input light according to control signals.

FIG. 7A illustrates an electrically controllable liquid prism lens within enclosed capsule 710, which may also be referred to as a pixel. The ray tracings are provided to generally illustrate the beam steering and beam shaping concepts and are not intended to indicate actual performance of the illustrated electrically controllable liquid prism lens. The enclosed capsule 710 is configured with one or more immiscible liquids (e.g., Liquid 1 and Liquid 2) that are responsive to an applied voltage from voltage source 715. For example, the liquids 1 and 2 may an oil and water, respectively, or some other combination of immiscible liquids that are electrically controllable. The desired spatial distribution effects are provided based on liquid 1 having a higher index of refraction than the index of refraction of liquid 2. The enclosed capsule 710, which has a physical shape of a cube or rectangular box, retains the liquids 1 and 2 to provide an electrically controllable liquid prism lens. The enclosed capsule 710 includes terminals 717A, 717B, 719A and 719B that are coupled to electrodes 1A, 2A, 3A and 4A, respectively.

As shown in the example of FIG. 7A, the pixel 700A has a first state, State 1A, in which the voltage source 715 outputs a voltage V1 that is applied across terminals 719A and 719B and the voltage source 726 outputs a voltage V2 that is applied across terminals 717A and 717B. The voltage V1 applied to electrodes 1A and 2A and voltage V2 applied to electrodes 3A and 4A causes the liquids 1 and 2 to assume the State 1A as shown on the left side of FIG. 7A. As shown, the input light is deflected to the right when pixel 700A is in State 1A. State 1A may represent the maximum deflection angle in the indicated direction. A range of deflection angles between the angle of State 1A and perpendicular (e.g., zero degrees) may also be obtained by adjusting the applied voltage appropriately. On the bottom right side of FIG. 7A, an example illustrates the output light deflection when pixel 700A is in State 2A. The pixel 700A achieves State 2A when the combination of voltages V1 and V2 is applied by voltage sources 715 and 716. The pixel in State 2A deflects the light in a direction opposite that of when the pixel is in State 1A. State 2A may represent the maximum deflection angle in the indicated direction. A range of deflection angles between the angle of State 2A and perpendicular (e.g., zero degrees) may also be obtained by adjusting the applied voltage appropriately. Also, the pixel 700A may achieve other states based on the input voltage, theses a third state (not shown) is an OFF state, as described with reference to FIG. 6B in which no voltage or a nominal voltage is applied that causes no deflection of the input light. In other words, the light passes directly through the spatial modulator pixel 700A without deflection. Hence, the angle of the deflection may be manipulated by adjusting the voltages applied by voltage sources 715 and 716. For example, the voltages V1 and V2 may not be equal. The voltages V1 and V2 may be applied simultaneously at different values to achieve a particular state between State 1A and State 2A. Although the voltages V1 and V2 are described as being applied simultaneously, the voltage V1 and V2 may be applied separately.

Although not shown, in some examples, a switching mechanism, such as transistors, may be used to switch the applied voltages from terminals 719A/719B to 717A/717B. Note that while the orientation of the pixel 700A shows the deflection of the light to the left and the right of the illustrated pixel 700A, it should be understood that the pixel may be oriented so the light deflects in any direction from the bottom of the pixel.

Alternatively or in addition, more complex electrode configurations may be implemented. For example, electrodes 1A-4A are shown on different sides of enclosed capsule 710 for the ease of illustration and description; however, additional electrodes may be on all four sides of the rectangular (or square) enclosed capsule 710. In which case, the enclosed capsule is capable of deflecting beams in multiple directions, not just left, right, forward, and backward, but also diagonally, for example.

The spatial modulator pixel 700B of FIG. 7B illustrates an electrically controllable lens having a beam shaping capability. The ray tracings are provided to generally illustrate the beam steering and beam shaping concepts and are not intended to indicate actual performance of the illustrated electrically controllable liquid prism lens. The pixel 700B, like pixel 700A, is configured with one or more immiscible liquids (e.g., Liquid 3 and Liquid 4) that are responsive to an applied voltage from voltage sources 715 and 716. For example, the liquids 3 and 4 may an oil and water, respectively, or some other combination of immiscible liquids that are electrically controllable. The desired spatial distribution effects are provided based on liquid 3 having a higher index of refraction than the index of refraction of liquid 4. In the illustrated example, the liquid 3 has a higher index of refraction than liquid 4. Although the enclosed capsule 730 is shown as a rectangular box, the enclosed capsule 730 may have the physical shape of a cube, a cylinder, ovoid or the like. The enclosed capsule 730 retains liquids 3 and 4, and is also configured with electrodes 1B and 2B that surround the periphery of the enclosed capsule 730. By surrounding the periphery of the enclosed capsule 730, voltages applied to the electrodes 1B-4B cause the liquids 3 and 4 to form a lens that provides beam shaping processing of the input light. Terminals 737A and 737B allow voltage source 735 to be connected to the pixel 700B. As shown on the top left side of FIG. 7B, the voltage source 735 applies a voltage V1 across the terminals 737A and 723B. In response to the applied voltages V1 and V3 the liquids 3 and 4 react to provide a concave shaped lens as State 1B. Input light from the light source (not shown) is processed based on control signals indicating the voltage to be applied by the voltage sources 735 and 736 to provide a shaped beam that focuses the light at a point the locus of which is electrically controllable.

The pixel 700B is further configurable to provide beam dispersion. As shown in the bottom right side of FIG. 7B, the pixel 700B based on applied voltages V1 and V3 forms a convex lens, shown as State 2B, that disperses the input light. In particular, the voltage source 735 applies voltage V1 across terminals 737A and 737B, which is then applied to electrodes 1B and 2B. Similarly, the voltage source 736 applies a voltage V3 that is applied across terminals 737C and 737D that is provided to electrodes 3B and 4B. The voltage V1 applied to electrodes 1B and 2B and the voltage V3 applied to electrodes 3B and 4B causes the liquids 3 and 4 to react to assume State 2B. Depending upon the voltages applied by voltage sources 735 and 736 to the respective electrodes, other states between States 1B and 2B may also be attained.

The beam steering functions of FIG. 7A and the beam shaping functions of FIG. 7B are described separately for ease of explanation; however, the functions and capabilities described and illustrated with reference to FIGS. 7A and 7B may be combined in a single electrowetting optic to provide a combined electrowetting optic that is capable of simultaneously beam steering and beam shaping, separately providing beam steering or separately providing beam shaping. By applying different voltages to the respective electrodes, the simultaneous electrically controllable beam steering and beam shaping may be provided. An example of an implementation that provides simultaneous electrically controllable beam steering and beam shaping is illustrated in FIG. 7C.

FIG. 7C illustrates an example of electrowettable lens 700C that includes an enclosed capsule 720 and voltage sources 725 and 726. The enclosed capsule 720 includes terminals 727A and 727B that couple to voltage source 725C and terminals 727C and 727D that couple to voltage source 726. The terminals 727A and 727B are further coupled to electrodes 1C and 2C and terminals 727C and 727D are further coupled to electrodes 3C and 4C. The liquids 3 and 4 respond to voltages applied to the electrodes 1C-4C to provide a combination of beam steering and beam shaping functions. The electrowettable lens 700C responds to different voltages from voltage sources 725 and 726 to attain the different states 1C-4C illustrated in the four different examples. The states 1C and 3C provide beam steering with focusing beam shaping, while states 2C and 4C provide beam steering but with defocusing beam shaping. The voltage sources 725 and 726 may apply voltages of different values including different polarities that enable the electrowettable lens 700C to provide variations of states 1C-4C that may be used to process light according to the selected images and selected spatial modulation.

FIGS. 8A, 8B, 8C, 8D, 9A and 9B illustrate different views of pixel matrices, such as examples of electrowettable lens or prism matrices that may be used to implement pixel-level selectable beam steering and/or beam shaping, e.g. in a device like that of either FIG. 4 or FIG. 5. Each of the respective pixel matrices 8A-8D may act as a matrix of lens that processes input light according to control signals.

Figure 8B:
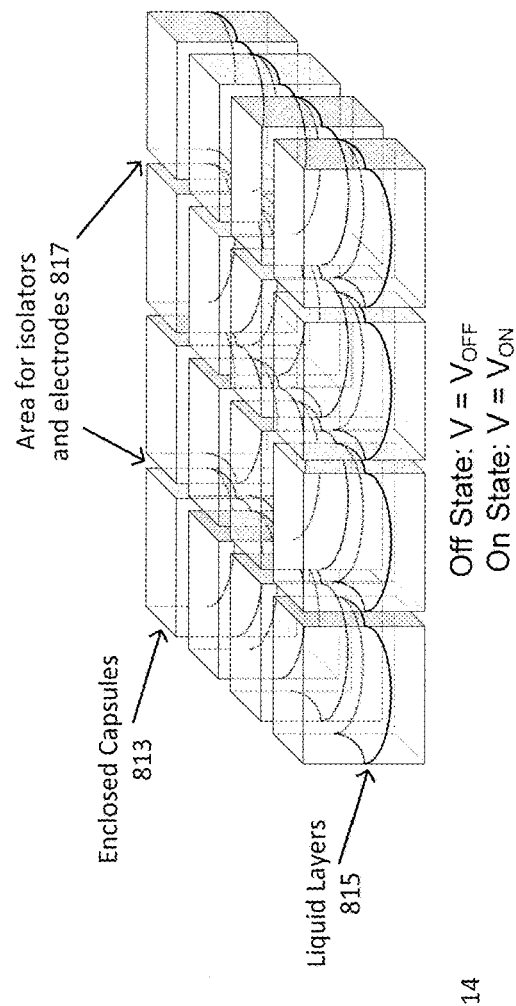
FIGS. 8A, 8B, 8C and 8D illustrate different views of matrices, for examples of electrowettable lens or prism matrices that may be used to implement pixel-level selectable beam steering and/or beam shaping, e.g. in a device like that of either FIG. 4 or FIG. 5A or 5B.
Figure 8A:
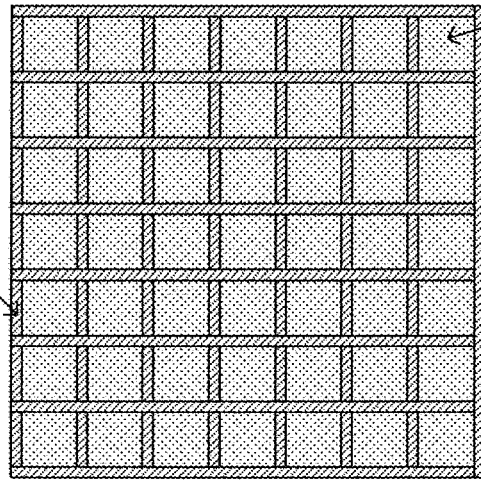

For example, FIG. 8A illustrates a top or bottom view of a matrix 800A that is formed from a number of pixels, such as the pixel 700A shown in FIG. 7A. The pixel matrix 800A includes isolators and electrodes 812 that surround enclosed capsules 814. As shown in FIG. 8B, the matrix 800B includes a number of enclosed capsules 814, which have liquid layers 815, for example, similar to the liquids 1 and 2 of FIG. 7A or liquids 3 and 4 of FIG. 7B. In the example of FIG. 8B, the different pixel states, such as States 1B and 2B shown in FIG. 7B, are attained by applying voltages. As shown in FIG. 8B, the Off state, which may correspond to State 1B, is achieved by an applied voltage of VOFF volts, while the On state (not shown) that corresponds to State 2B of FIG. 7B is achieved by applying a voltage of VON volts. Of course, the voltages VON and VOFF may be any voltage and/or polarity, such as ±10 volts or ±10 millivolts, suitable for achieving the desired beam steering (e.g., angular modulation) or beam shaping. Said differently, the control signal may be analog so the control of the beam shaping or beam steering may extend over a range of focal lengths (e.g., narrow focused beam to wide dispersed beam) or over a range of angles (e.g., zero degrees, or straight out, from the lighting device to an angle that may be up to approximately 90 degrees from the vertical, or even greater than 90 degrees depending upon the geometry of the electrowettable lens or lighting device).

While FIG. 8B shows pixel states similar to those achievable by individual pixel 700B, a pixel matrix similar to pixel matrix 800A and/or pixel matrix 800B may be used to generate the liquid lens prisms of pixel 700A. As mentioned above, the electrodes 727A and 727B may surround the perimeter of the enclosed capsule 720. Similarly, the electrodes 812 may also surround individual pixels in the matrix 800A.

Figure 8C:
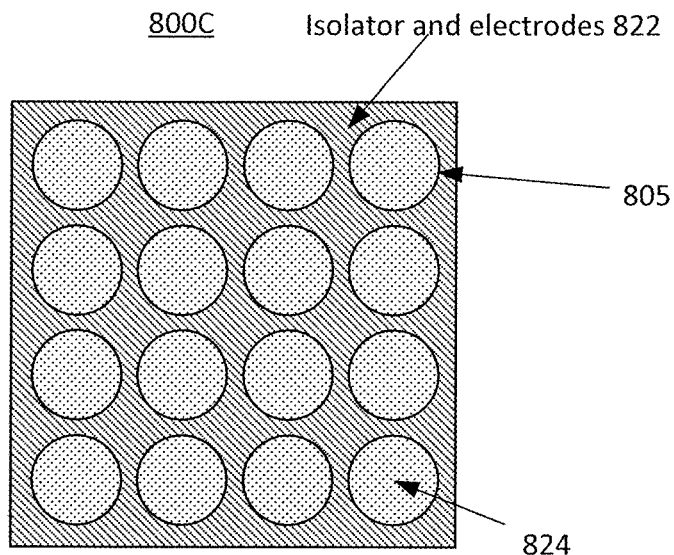
Figure 8D:
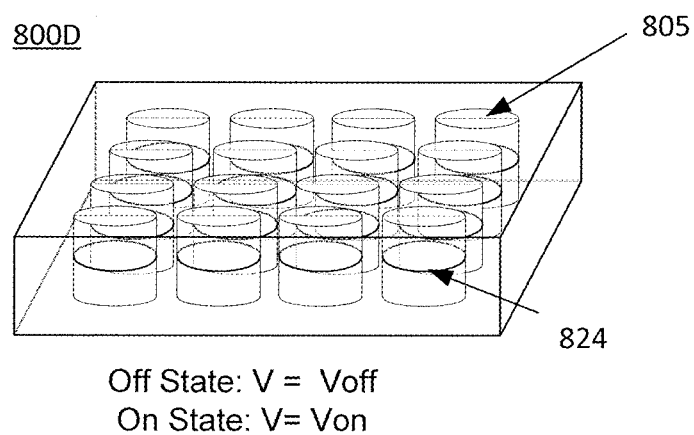

Another example of a pixel matrix is matrix 800C shown in FIG. 8C. The pixel matrix 800C includes isolators and electrodes 822 that surround enclosed capsules 805. The individual pixels, in this example, that correspond to enclosed capsules 805 of matrix 800C may be circular or elliptical enclosed capsules that contain liquid layers 824. The pixel matrix 800C includes isolators and electrodes 822 that surround enclosed capsules 805. FIG. 8D shows a cross-sectional view of a matrix 800D. As shown in FIG. 8D, the matrix 800D includes a number of enclosed capsules 805, which have liquid layers 824, for example, similar to the liquids 1 and 2 of FIG. 7A or liquids 3 and 4 of FIG. 7B. The pixels in the matrix 800D provide pixel lens prisms that are individually electrically controllable, or that may be controllable in groups, such as 2-4 individual pixels may be responsive to a first control signal while other pixels are responsive to second, third and so on commands. Each of the pixels may respond in either the same manner to an applied voltage or differently based on the type of enclosed liquids or shape of the individual pixels.

Similar to the discussion with respect to FIGS. 7A and 7B, the voltage applied to the electrodes of the isolators and electrodes 822 in FIG. 8C causes a response in the respective pixels 805 in order for a desire output light image and general illumination distribution to be attained. For example, the individual pixels in the matrix 800D of FIG. 8D have an OFF state that is attained by applying a voltage VOFF to the electrodes 822. The isolators of the isolators and electrodes 822 serve to isolate the other pixels both electrically and optically from spurious light from adjacent light sources to the respective pixels. The OFF state may be a state in which light from a light source passes through the respective pixels of the matrix 800D without being processed without controlled deflection of the light from the light source. Alternatively, the input light may be processed according to a predetermined state, such as states 1A, 2A, 1B or 2B of FIGS. 7A and 7B, that the respective pixel attains when a voltage is applied. Similarly, the pixel may also have an ON state in which the applied voltage is VON. Different pixels in the pixel matrices 800C and 800D as well as 800A and 800B may have pixels at different states (as described with reference to FIG. 6B above) based on different applied voltages, which may be a range of voltages not only specific voltages, such as VON or VOFF. The range of ±10 volts mentioned above may include a VOFF of 0 volts, but have a range of VON settings, such as at both −10 volts and +10 volts, between the voltages of −3 volts and +5 volts, or some other settings.

Figure 9A:
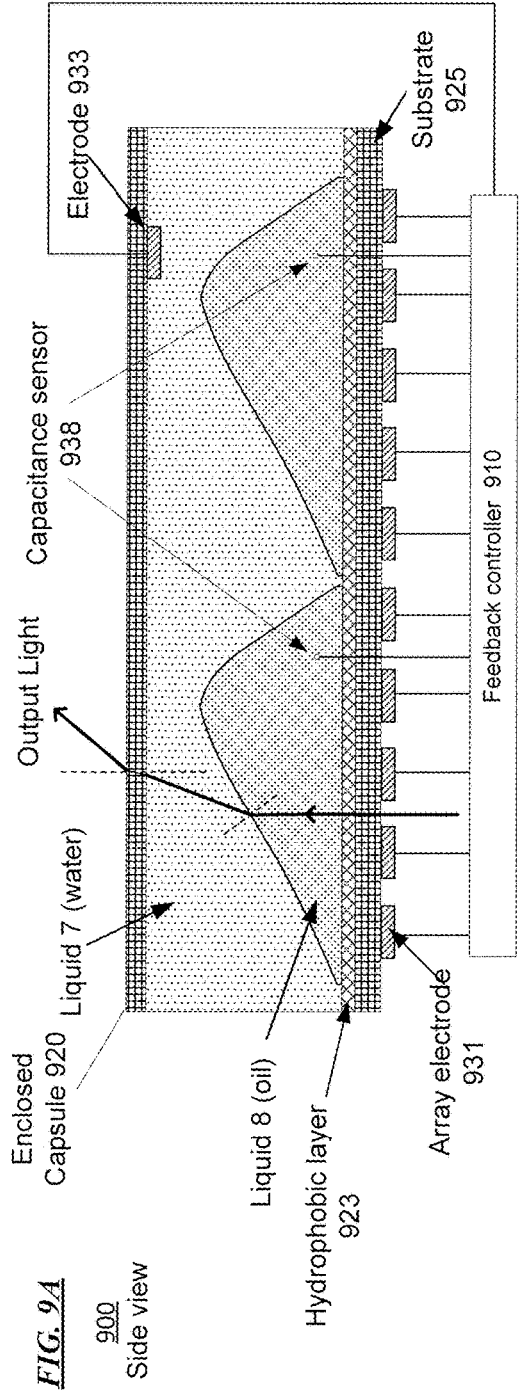
FIGS. 9A and 9B illustrate an example of an electrowettable lens that enables a standing or moving waveform optic configuration that provides selectable beam steering and/or beam shaping, e.g. in a device like that of either FIG. 4 or FIGS. 5A and 5B.
Figure 9B:
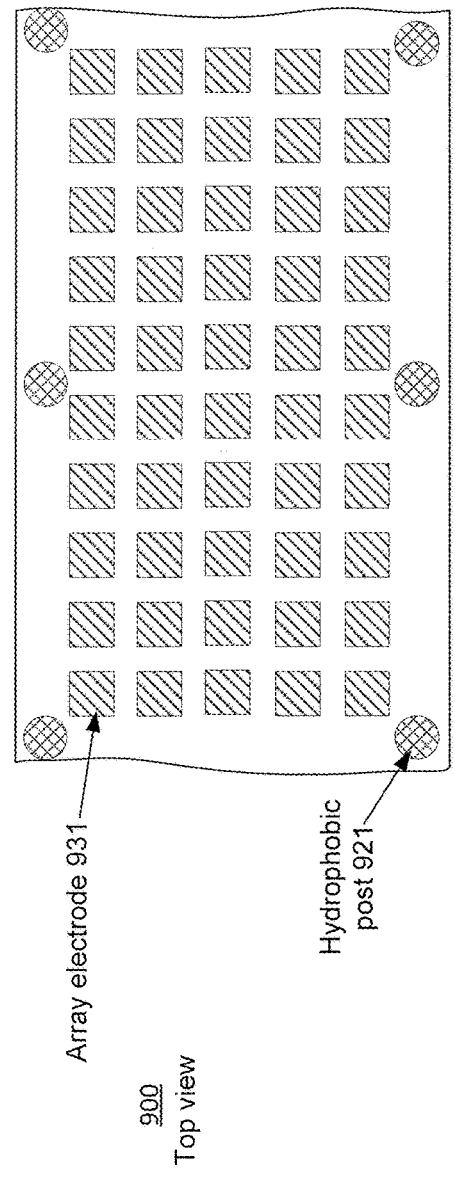

Another example of an electrowettable lens is shown in FIGS. 9A and 9B. The electrowettable lens illustrated in FIGS. 9A and 9B is able to provide a standing or moving wave configuration as illustrated in FIG. 9A. The electrowettable 900 includes a feedback controller 910, an enclosed capsule 920, array electrodes 931 and an electrode 933. The enclosed capsule 920 includes liquids 7 (e.g., water), liquid 8 (e.g., oil), a substrate 925, and a hydrophobic dielectric layer 923 are surfaces that repel liquids. A hydrophobic dielectric post 921 is a support member as shown in FIG. 9B, but is not shown in FIG. 9A for ease of illustration. The hydrophobic post 921 in some examples, is used to establish an initial flat film of the liquid 8 (oil) in the absence of a voltage from feedback controller 910. The enclosed capsule 920 also includes array electrodes 931 and electrode 933, which may be transparent.

The electrodes of the array electrode 931 are individually controllable by the feedback controller 931 in response to control signal provided by a microprocessor (such as microprocessor 123 of host system 115. The feedback controller 910 in response to signals from the capacitance sensors 938 manipulates the voltages applied to the array electrodes 931 to maintain the standing wave in liquids 7 and 8.

In an example, an initial high voltage is applied by the feedback controller 910 at a specific electrode in the array electrodes 931 to dewet the liquid 8 (oil) so that the oil begins to rise away from the hydrophobic layer 923. However, before the oil completely dewets the hydrophobic dielectric layer 923 (which is determined based on the capacitance between the water and electrode according to measurements by the capacitance sensor 938), the voltages applied to the array of electrodes 931 are switched back to a lower voltage to undewet the hydrophobic dielectric surface 923. This process is performed over multiple instances such that the thickness of liquid 8 (oil) at that particular electrode in the array of electrodes 931 will reach a substantially stable thickness at a particular electrode of the array of electrodes 931. As a result, a standing wave lens structure may be achieved. In another example, a moving wave lens structure may be achieved by dynamically controlling the voltage to the patterned electrodes of the array of electrodes 931.

It should be noted that the geometry of the oil/water interface is not limited to prism shaped as shown in above figure, the provided lens geometries could be any combination of vertically oriented convex and concave oil geometries as long as there are adequate electrodes, the aspect ratio is not too great, and control signals provided to the feedback controller 910 provide the selected spatial modulation.

It is also envisioned that lens geometries may also be created that will move horizontally (e.g., left to right through the enclosed capsule 920) with time. For example, voltages at a particular frequency and timing may be applied to individual electrodes of the array electrodes 931 to generate standing waves in a time sequence, such that the standing waves appear as a constant lens geometry.

FIG. 9B illustrates a top view of electrowettable lens example of FIG. 9A. The electrowettable lens 900, as do similar electrowettable lens in FIGS. 7A-8D, includes transparent surfaces and electrodes that do not add significant optical processing (e.g., refraction) to the light output from the respective lenses. As a result, the number of array electrodes 931 in electrowettable lens 900 under control of the feedback controller 910, or a processor, such as microprocessor 123 of host processor 115, may provide complex wavefronts in various directions to provide the selected spatial modulation.

Other examples of spatial distribution and light generation systems are also envisioned. These other systems may incorporate other variations of the previously described electrowettable lens.

The matrices of FIGS. 8A, 8B, 8C, 8D, 9A, and 9B may be configured to process the input light by providing only beam shaping or beam steering. In order to obtain both beam shaping and beam steering, the respective matrices may be stacked so that light processed by a first pixel matrix (e.g., 800A) may be further processed by a second pixel matrix (e.g., 800C). For example, a light source may be stacked on a beam shaping pixel matrix, which is further stacked on a beam steering matrix. The light source may output to the beam shaping pixel matrix which shapes the beam of input light according to a control signal. The shaped light beam is output from the beam shaping matrix to the beam steering pixel matrix. The beam steering pixel matrix in response to a control signal attains a beam steering state that provides the desired beam steering angle. As a result, the light output from the system, such as 111 or 311, provides, for example, a selected general illumination having the combination of beam shaping and beam steering.

Of course, other pixel matrix stacking configurations are possible, such as beam steering on beam shaping, multiple beam steering matrices on top of one another, or the like. For example, multiple beam steering matrices may be stacked to obtain greater angular deflection, such as a "wall wash" general illumination pattern or some other general illumination pattern. In addition, the stacked matrices may be set to a state that permits the light to pass through without applying any beam shaping or beam steering. Or said differently, one or more of the stacked matrices permit the light to pass through unprocessed. While the above discussion mentioned only two stacked matrices, it is envisioned that more matrices may be stacked together to obtain the selected image display and general illumination distribution characteristics.

In addition, the respective matrices may also provide a combination of beam shaping and beam steering. An example of this combination of capabilities, a pixel matrix may include a number of beam shaping pixels and a number of beam steering pixels. Since each pixel is individually controllable, the respective beam shaping pixels of the combined matrix may receive one or more control signals that indicate the desired beam shaping, while the respective beam steering pixels of the same combined matrix may receive one or more control signals different from the control signals provided to the beam shaping pixels. Therefore, combination matrices may be formed to provide different light processing effects.

In yet another example, a set of matrices may be combined in a lighting system. For example, a lighting device may comprise three lighting matrices. Of the three matrices, two may be beam steering matrices and one may be a beam shaping matrix. The three matrices may be configured with the beam shaping matrix in the center and the beam steering matrices on either side of the beam steering matrices. Of course, other configurations and number of the different matrices, including stacks of matrices, may be envisioned and implemented to achieved the selected image display and general illumination.

The above description of electrowettable lenses in FIGS. 7A-9B were described as transmissive. In an example of a transmissive electrowettable lens, an optical transparent thin film with graded (i.e., gradually changing) refractive index may be added in between of the two liquids (e.g. oil and water). The light incident on the thin film will pass through it. The refractive index of the thin film may change gradually from the oil to the water, which may help to decease the Fresnel loss. For example, the thin film may be a stack of graded refractive index material, or may be a thin film with periodic nanostructures that provide an effective graded refractive index.

In other examples, the electrowettable lenses in FIGS. 7A-9B may be reflective. For example, a reflector may be placed at the output of electrowettable lens 700A that reflects light back into the cell 700A of FIG. 7A. This reflected light obtain even greater beam shaping and/or steering. In another example, a reflective material is added, such as silver leaf, between the two liquids so that a controllable reflective surface is created to provide beam steering.

In another example, a reflective thin film, such as silver leaf or a mirror, may be disposed in between liquid 1 and liquid 2 (e.g. oil and water or vice versa), and large scale beam steering may be achieved. In this example, the steering angle of reflective thin film may be determined by the contact angle between the two liquids, which may be electrically controlled. Incident light may be reflected by the reflective thin film, and the reflected angle is determined by the contact angle between the two liquids. Similar modifications may be made in examples illustrated in FIGS. 7C-9B to provide controllable reflective elements.

Figure 10A:
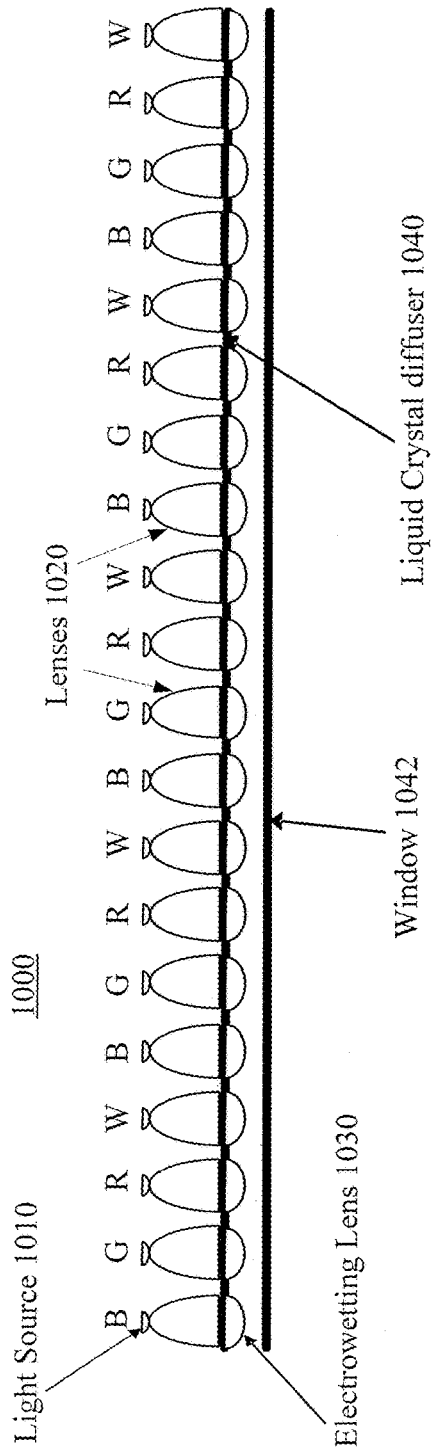
FIG. 10A is a side view of an example of a pixel controllable light generation and spatial light distribution system, with separate red (R), green (G), blue (B) and white (W) sources and associated optics.

FIG. 10A is a side view of an example of a pixel controllable light generation and spatial light distribution system, such as 111 of FIG. 2, with separate red (R), green (G), blue (B) and white (W) sources and associated optics. The pixel controllable light generation and spatial light distribution system 1000 of FIG. 10A may be arranged as a matrix, as shown in FIGS. 8C and 8D. The pixel controllable light generation and spatial light distribution system 1000 includes light sources 1010, lenses 1020, beam steering lenses 1030, such as electrowetting lenses, liquid crystal diffuser 1040 and a window 1042. The light sources 1010 may be LEDs, OLEDs, plasma, microLEDs, or the like. The lenses 1020 may be total internal reflection (TIR) lenses, microlens films, or the like. In a specific example, the light sources 1010 are microLEDs and the lenses 1020 are microlens film that is used instead of a TIR lens to provide light collimation. In this example, each microLED source 1010 has to be aligned with a microlens for better light collimation. An aligned microlens film may be, for example, a combination of microlens arrays (MLAs) used typically in projectors to homogenize light across a microdisplay.

The liquid crystal diffuser 1040 may be pixelated. The pixelated liquid crystal diffuser 1040 may be formed from liquid crystals that are electrically controllable to enable portions of the liquid crystal diffuser 1040 to diffuse, or disperse light, output from the respective light sources 1010. The liquid crystals of the liquid crystal diffuser 1040 may be controlled to permit light to pass substantially unimpeded, or to provide a gray scale mask to the pixel controllable light generation and spatial light distribution system 1000. An advantage of the liquid crystal diffuser 1040 is that it can be controlled to provide a more uniform look to the outputted light. The window 1042 may be transparent and may serve to keep dust and airborne impurities away from the pixel controllable light generation and spatial light distribution system 1000.

The light sources 1010 are shown as separate red (R), green (G), blue (B) and white (W) sources, and may be LED, organic LED (OLED), plasma light sources or the like. The light sources 1010 may be a broad area light source. Each light source may be coupled to a lens 1020, such as a TIR lens. An advantage of using TIR lenses, the TIR lens 1020 collimates the light of the respective light source and eliminates "cross talk" or light interference between the light generated by the individual light sources. The electrowetting lens 1030 may be lenses, or pixels, similar to those described with reference to FIGS. 7A-8D above and may respond to control signals from a controller (shown in other examples). The electrowetting lens 1030 provide spatial modulation, such as beam shaping (e.g., focus) and beam steering (e.g., angular modulation) in response to received control signals.

Figure 10B:
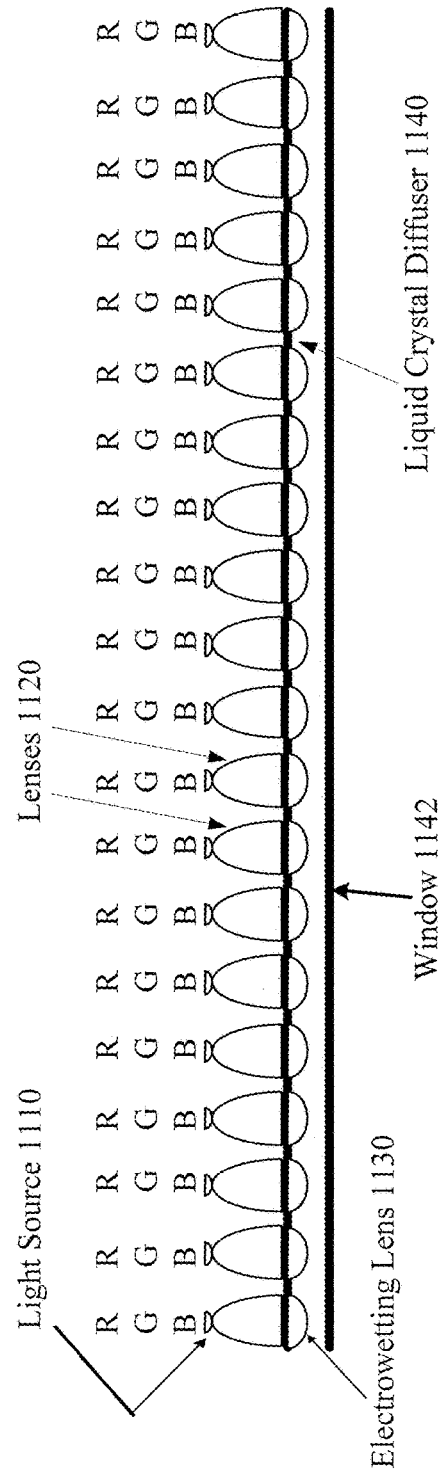
FIG. 10B is a side view of another example of a pixel controllable light generation and spatial light distribution system, with combined red (R), green (G) and blue (B) sources and associated optics.

FIG. 10B is a side view of another example of a pixel controllable light generation and spatial light distribution system, with combined red (R), green (G) and blue (B) sources and associated optics. The arrangement of the pixel controllable light generation and spatial light distribution system 1100 is similar to that of FIG. 10A. For example, the pixel controllable light generation and spatial light distribution system 1100 includes light sources 1110, lenses 1120, lenses 1130, liquid crystal diffuser 1140, and window 1142. The discussion of the component parts of the system 1000 also applies to the respective component parts of system 1100. The light sources 1010 may be LEDs, OLEDs, plasma, or the like. In the system 1100, the respective light sources 1110 are individually controllable to provide respective RGB light output to provide the desired image output and general illumination lighting based on received control inputs from a controller (shown in other examples). An advantage of this configuration of light sources 1110 is that it reduces the amount of heat generated by the light sources 1110. The lenses 1120 may be TIR lenses or the like. Although the examples are shown using RGBW and RGB light sources, light sources with more or less colors may be used. For example, light source colors such as amber, cyan or the like, may be using in place of, or in addition to, the RGB or W light sources described in the above examples. Of course, any of the light sources may contribute to the image display and/or the general illumination distribution.

Figure 11:
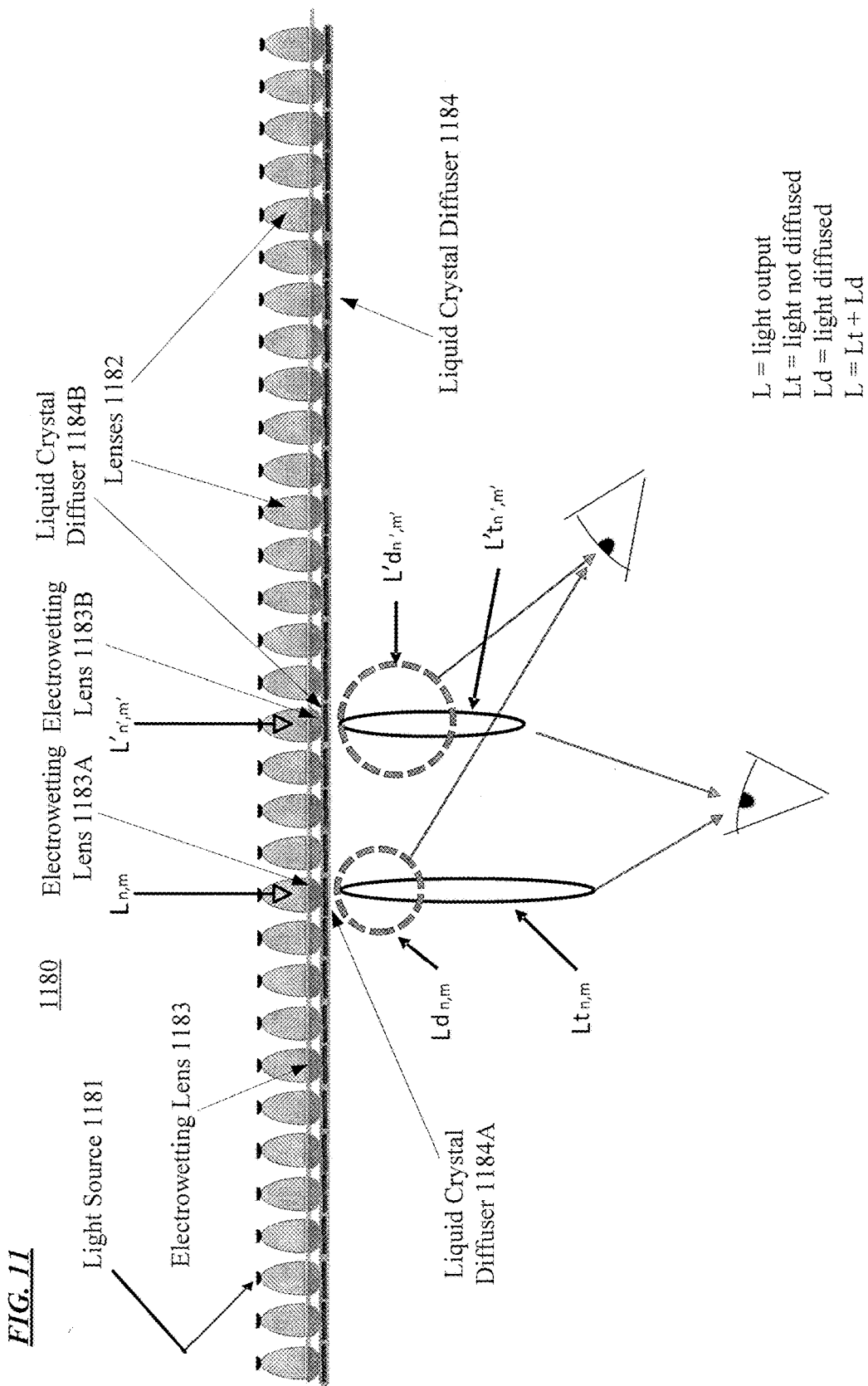
FIG. 11 is a side view of yet another example of a pixel controllable light generation and spatial light distribution system, similar to FIGS. 10A and/or 10B but illustrating a superposition of the general illumination light and the display image output.

FIG. 11 is a side view of yet another example of a pixel controllable light generation and spatial light distribution system, similar to FIGS. 10A and/or 10B but illustrating a superposition of the general illumination light and the display image output.

As shown in FIG. 11, the pixel controllable light generation and spatial light distribution system 1180 includes light sources 1181, lenses 1182, electrowetting lens 1183 and a liquid crystal diffuser 1184. The light sources 1181 may be LED, OLED, plasma or the like. The pixel controllable light generation and spatial light distribution system 1180 is responsive to control signals from a controller (not shown), but similar to the microprocessor 123 of FIG. 1. The arrangement of the pixel controllable light generation and spatial light distribution system 1180 is similar to that of FIGS. 10A and 10B except the liquid crystal diffuser, such as 1040 of FIG. 10A, is located beneath the electrowetting lens 1183. The liquid crystal diffuser 1184 in the example of FIG. 11 is pixelated. The individual pixels of the pixelated liquid crystal diffuser 1184 may also be individually controllable or may be controllable in groups, such as 4 pixels, 8, 9 or the like, that are responsive to control signals from a controller (not shown). Similarly, the electrowettable lens 1183 is pixelated and each of the pixels, individually or in a group, may also be responsive to control signals from a controller (not shown). For example, The light sources 1181 are arranged in an n×m matrix. Light $L_{n,m}$ may be generated by a respective light source of light sources 1181 is output to the electrowetting lens 1183 and the liquid crystal diffuser 1184. The generated light $L_{n,m}$ is modulated by the electrowetting lens 1183A and the liquid crystal diffuser 1184A based on the control signals received from the controller (not shown). In response to the control signals, the electrowetting lens 1183A and the liquid crystal diffuser 1184A generate light $Lt_{n,m}$ and $Ld_{n,m}$ that is produced based on the selected image display and general illumination distributions. The light $Lt_{n,m}$ is transmission light and the light $Ld_{n,m}$ is diffused lighting. The light $Lt_{n,m}$ may provide the detailed portions of the image presented by the lighting device as well certain aspects of the general illumination, such as task lighting or focused light. The diffuse light $Ld_{n,m}$, in the example, may add background, shading or other effects to the displayed image and/or the general illumination lighting. In the example, the light Ltn,m has a greater intensity with less diffused light $Ld_{n,m}$. Conversely, light $L'_{n',m'}$ generated by another light source in the matrix of light sources 1181 is modulated by the respective electrowettable lens 1183B and liquid crystal diffuser 1184B to output light $L't_{n',m'}$ and $L'd_{n',m'}$ having a greater amount of diffusion of the diffuse light L'dn',m' and less intensity of the light $L't_{n',m'}$. The respective pixels of the electrowettable lens 1183 and liquid crystal diffusers 1184 are controlled by the controller (not shown) to provide a generated light output that satisfies the selected general illumination distribution and the image display.

A window (not shown) such as window 1042 or 1142 may also be included with system 1180, but has been omitted for ease of illustration.

The system 1180 may also be configured with a diffuser 1184 that allows the system 1180 to blend with the ceiling or wall aesthetics and structure such that the system 1180 appears as a ceiling tile or wall tile or hanging. By incorporating latchable and switchable materials, the system 1180 may be configured with OFF state parameters image that present an OFF state image. Examples of latchable and switchable materials include E-ink or cholesteric liquid crystals. In the case of E-ink, the E-ink in the diffuser 1184 may have to be spatially interlaced.

Figure 12:
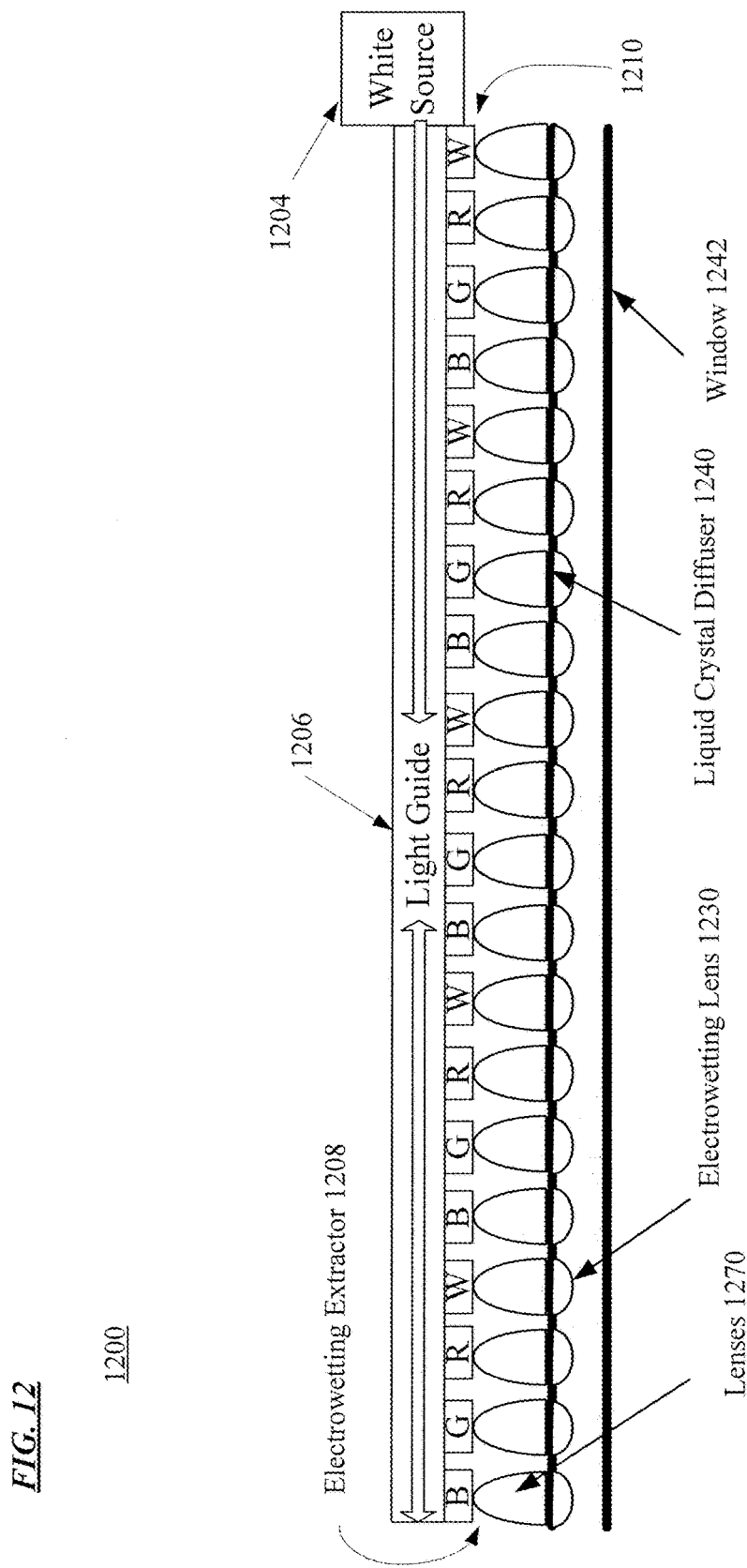
FIG. 12 is a side view of another example of pixel controllable light generation and spatial light distribution system, similar to FIGS. 10A and/or 10B but using a white light source, a light guide and controllable color extractors to supply R, B, G and W light to the optics.

In yet another example, the pixel controllable light generation and spatial light distribution system may have another configuration. FIG. 12 is a side view of another example of pixel controllable light generation and spatial light distribution system, similar to FIGS. 10A and 10B but using a white light source, a light guide and controllable color extractors to supply R, B, G and W light to the optics.

The pixel controllable light generation and spatial light distribution system 1200 includes a white light source 1204, a light guide 1206, an electrowetting extractor 1208 adjacent to the light guide 1206, color filters 1210, a lens 1220 associated with the respective color filters, an electrowetting lens 1230, a liquid crystal diffuser 1240, and window 1242. The white light source 1204, for example, may be a high lumen light source that generates light at a specified light output. The electrowetting extractor 1208 is similar to the pixel matrices 800A and 800B, and may have individually controllable pixel lenses such as those shown in FIGS. 7A and 7B. The individual pixels of the electrowetting extractor 1208 may be controlled by a controller (not shown in this example), such as host processor 115. The color filters 1210 may be of different colors such as R, G, B, or white (W) as shown, may be combinations of RGB filters, or may be different types of suitable filters. In addition, the filters 1210 may be dichroic in order that light may be recycled back into the wave guide 1206.

In an example of the operation of the system 1200, the white light generated by the white light source 1204 is output to the light guide 1206. The light guide 1206 disperses the light which is output via one or more of individually controllable electrowetting extractors 1208 for color filtering and output from the lighting device. The color (in this case, RGB) filters 1210 filter the light to output a selected color of light. For example, based on a control signal, the output colors for the individual pixels may also be selected. The colored light is output from the respective filters 1210 to the TIR lens 1220, which further directs the lights to the electrowetting lens 1230. As discussed with regard to other examples, the electrowetting lens 1230 may have individually controllable pixels that are controlled (by a controller) to provide beam shaping and/or beam steering. The window and liquid crystal diffuser 1240, as in the examples of FIGS. 10 and 11, provides a more uniform look to the output to the system 1200.

In another example of the operation of the system 1200, the system 1200 may be controlled to provide an image that has a red light (R) component. The liquid crystal diffuser 1240 may be controlled to permit a percentage of red light (e.g., 5%) to pass through the diffuser 1240 unobstructed. As a result of permitting the 5% of red light to pass, the general lighting distribution, such as a spot light or task lighting distribution, loses a percentage of light that was intended to be used for the general lighting distribution. In order to make for the loss of the 5% of red light, other colors may be increased in intensity to accommodate for the 5% loss of red light. The increased intensity of each light may be divided among the remaining colors for example, the initial 5% may be divided across 4 different colors (e.g., RGBW), so the remaining colors GBW have to contribute an additional 1.25% of intensity to mitigate the loss of the 5% of red in the general lighting. Of course, other lighting concepts may be implemented to insure substantially unnoticeable changes in a selected general lighting distribution when an image display is changed. Although explained with reference to FIG. 12, the other illustrated examples may also implement similar control algorithms and processes to ensure delivery of selected general lighting distributions.

Beam steering and/or beam focusing systems other than electrowetting lens are also envisioned. For example, liquid crystal (LC) panels, polarization gratings (PG), and a combination of LC and PG may also be used to achieve the selected image display and general illumination light distribution (e.g., beam shaping and/or beam steering). In some examples, LC panels are used to change the polarization of input light, and PGs diffract light based on the polarization of the light that is input to the respective PG. PGs have a nematic LC film with a continuous periodic pattern.

Within a PG's LC film pattern, the in-plane uniaxial birefringence varies with the position of the input light along the grating period. The grating period is spacing of the liquid crystals that form the grating of the polarization grating. There are two types of PGs: a passive PG and an active PG.

A passive PG changes the handedness of circular polarized light into an opposite state (i.e., from left handed to right handed and vice versa) due to the light phase shift when passing through PG. Additionally, the light will be diffracted to either in a +1 state or a −1 state depending upon the handedness of input circular polarized light. The diffraction angle also depends the input light wavelength and a grating periodic of PG.

An active PG is responsive to a voltage applied to electrodes connected to the PG. In some examples, when the applied voltage is zero (0) volts, the active PG responds as a passive PG as explained above. When a voltage is applied that exceeds a threshold voltage (Vth), the periodic nature of the PG is altered, and, as a result, the light polarizing and the diffractive effects on the input light are eliminated. Said differently, when a voltage over a threshold voltage is applied to the PG, the input light is no polarized and the direction of the light will not be changed after passing though the active PG. Conversely, if no voltage is applied to the active PG, the light will be diffracted to either a positive (+) 1 state (or direction) direction or in a negative (−) 1 state (or direction) depending upon the handedness of input circular polarized light. In other words, the diffraction properties of the active PG are controlled by applying a voltage to electrodes (not shown) of the PG, that controls the amount of light distributed between the (0) direction and ±1 directions.

In the fabrication of either a passive PG or an active PG, the angle of diffraction is set when the PG is fabricated and the angle of diffraction be different for different wavelengths of light and for light with different polarizations. For polarized light, the angle of the diffraction is either in a +1 state (or direction) or in a −1 state (or direction), but the angle of diffraction is the same just the numerical sign and direction is different. Unpolarized light is diffracted equally into the ±1 directions by either the passive PG or the active PG.

Figure 13A:
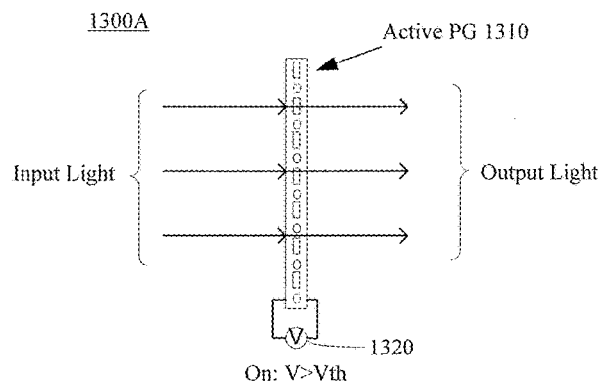
FIGS. 13A to 13C illustrate various aspects of another example of a pixel-level selectable beam steering matrix, using active, switchable Polarization Grating (PG) for spatial beam modulation of generated light.
Figure 13B:
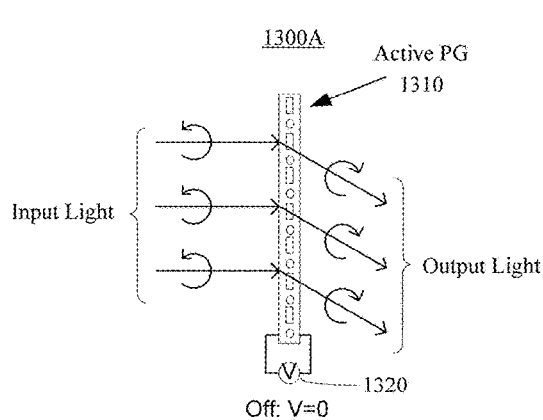
Figure 13C:
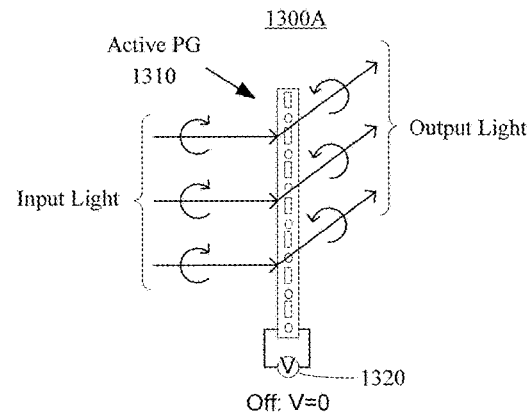

FIGS. 13A to 13C illustrate various aspects of an example of a pixel-level selectable beam steering matrix, using an active, switchable PG for spatial beam modulation of generated light. Spatial beam modulation includes beam steering. FIG. 13A shows an example of a system 1300 that includes an active PG 1310 and a voltage source 1320. The voltage source 1320 in the example is applying a voltage greater than a threshold voltage Vth to the active PG 1310. The voltage may be applied to electrodes (not shown) in the active PG 1310. As shown in the example, when the greater than threshold (>Vth) voltage is applied to the PG 1310 and polarized light is input to the active PG 1310, the input light (from a light source) passes through the active PG 1310 without being diffracted or having the polarization of the input light being changed.

Alternatively, when a voltage less than the threshold voltage Vth is applied, such as a zero (0) voltage, as shown in FIG. 13B, the same active PG 1310 processes light input to the active PG 1310 in the same manner as a passive PG. In the example of FIG. 13B, the input light is left-hand (LH) circular polarized. When the LH circular polarized light is applied to active PG 1310, the output light is right-hand (RH) circular polarized light and is diffracted at a predetermined angle Θ from the angle of incidence of the input light and in a direction that is a negative angle, or −1 state. Alternatively, in FIG. 13C, the input light is right-hand (RH) circular polarized. When the RH circular polarized light is applied to active PG 1310, the output light is diffracted, also at a predetermined angle Θ from the angle of incidence but in an opposite direction, in this example, a positive angle, or +1 state, and is left-hand (LH) circular polarized light.

The example of FIGS. 13A-C illustrate the capabilities of active PGs with respect to different polarized lighting. As mentioned above, LC plates also may be used to process light to produce different effects. LC plates may also be active (i.e., responsive to an applied voltage) and when combined with a passive PG provide different light outputs. FIGS. 14A-14D illustrates examples of the response of passive, switchable LCPGs to the application of left handed circular polarized light and right handed circular polarized light.

Figure 14A:
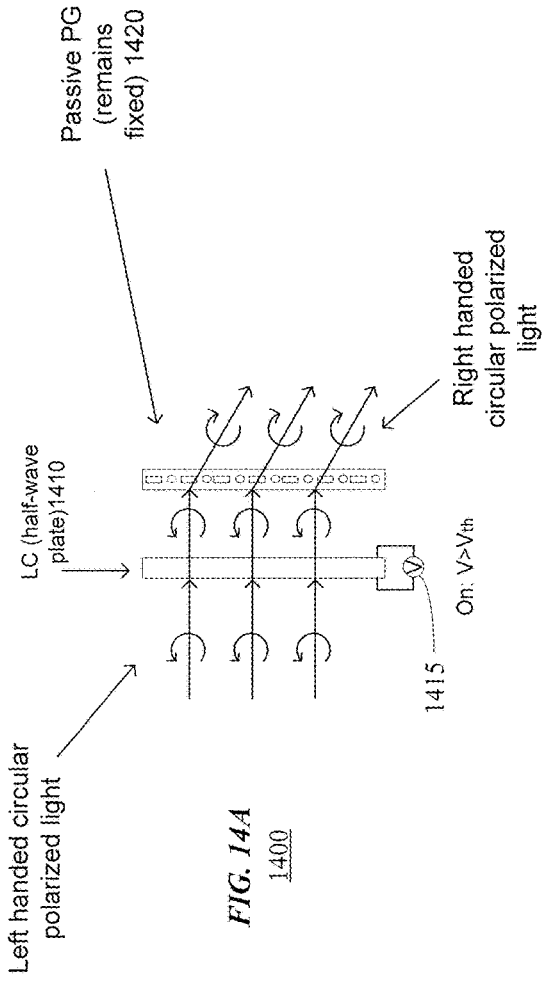
FIGS. 14A-14D illustrates examples of the response of passive, switchable LCPGs to the application of left handed circular polarized light and right handed circular polarized light.
Figure 14B:
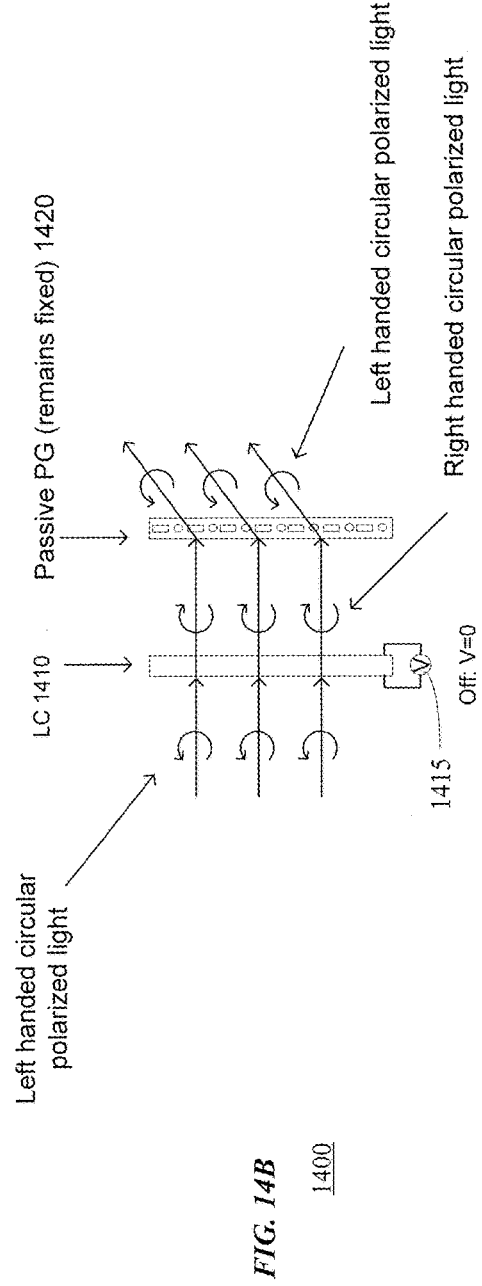

In general, when a passive PG is coupled with an active LC, the LC will change the polarization of input light if no voltage is applied to it, and the PG diffracts the light into either +1st or −1st state direction depending upon the input light polarization. By controlling the LC, the input light polarization may be controlled, which affects the diffraction order of the input light after passing through the coupled passive PG. In the example of FIG. 14A, the system 1400 includes a LC 1410, such as a half-wave plate, and a passive PG 1420, which remains fixed. The polarization properties of the LC 1410 are controlled by applying a voltage to electrodes (not shown) coupled to the LC. A voltage source 1415, which may be responsive to a control signal, may apply a voltage V that is greater than a threshold voltage Vth. In the example of FIG. 14A, LH circular polarized light is input to the LC 1410 to which the voltage source 1415 is applying a voltage greater than Vth (i.e., >Vth). Due to the applied voltage Vth, the LH circular polarized light of the input light is unaffected by the LC 1410. However, when the LH circular polarized light output from the LC 1410 is input to the passive PG 1420, the LH circular polarized light is diffracted at some predetermined angle as a +1 order output, for example, and the polarization of the light output from the passive PG 1420 has a RH circular polarization. Alternatively, in the example of FIG. 14B, the voltage source 1415 instead of outputting a voltage greater than (>) Vth, is shown outputting a zero (0) voltage (i.e., V=0) or some voltage less than (<) Vth. As a result of the reduced voltage, the LC 1410 acts to switch the polarization of the input light. In the FIG. 14B example, the LH circular polarized light input to the LC 1410 is output from the LC as RH circular polarized light. The RH circular polarized light output from the LC 1410 is input to the passive PG 1420. The passive PG 1420 diffracts the RH circular polarized light to the same predetermined angle but as a −1 order output, and also changes the polarization of the inputted light from RH circular polarized light to LH circular polarized light.

Figure 14C:
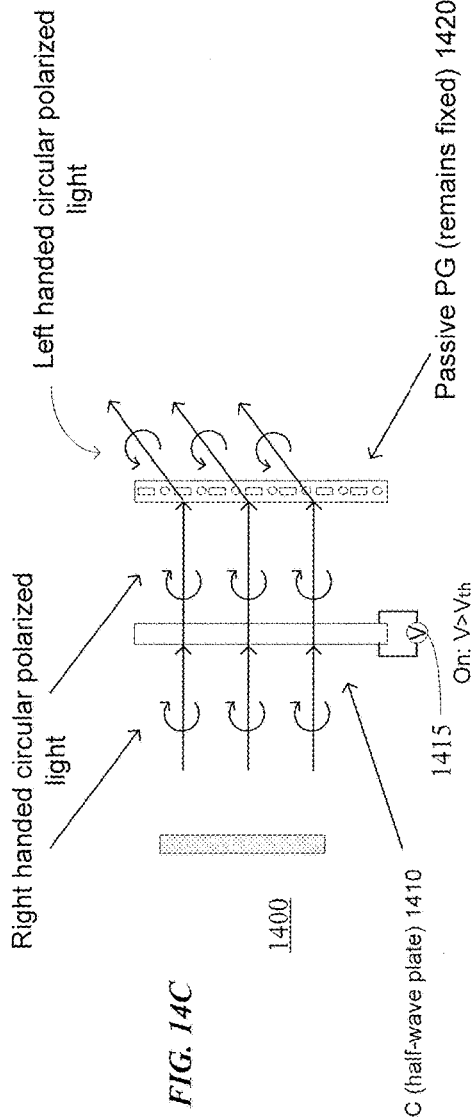
Figure 14D:
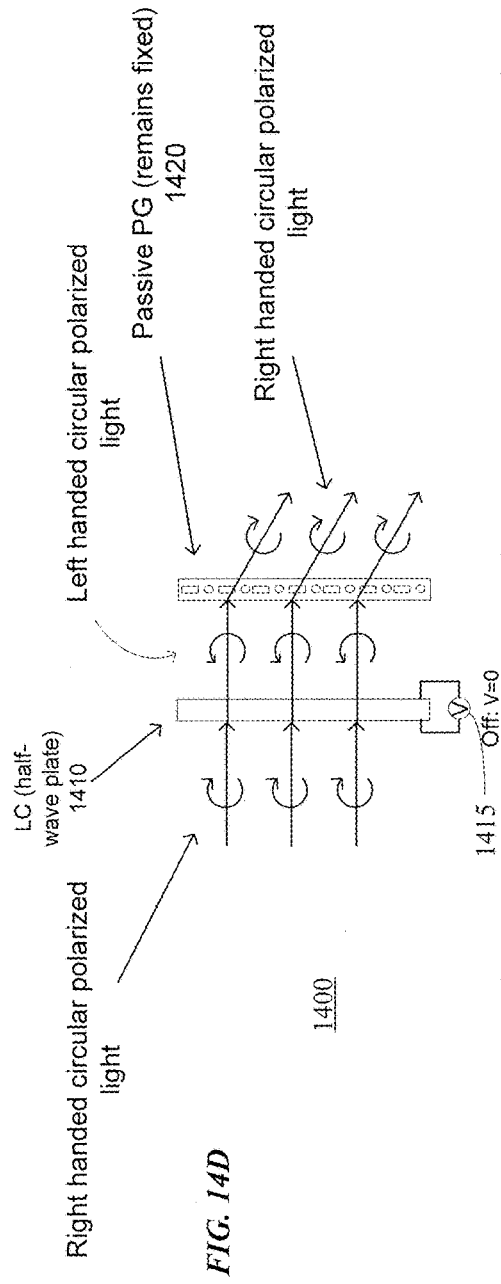

In yet another example using the implementation of the system 1400, FIG. 14C illustrates RH circular polarized light as an input to the LC 1410 when the voltage applied by the voltage source 1415 is greater than Vth. Due to the applied voltage Vth, the RH circular polarized light of the input light is unaffected by the LC 1410. However, when the RH circular polarized light output from the LC 1410 is input to the passive PG 1420, the RH circular polarized light is diffracted at some predetermined angle, for example, as a −1 state output and the polarization of the light output from the passive PG 1420 has a LH circular polarization. Alternatively, in the example of FIG. 14D, the voltage source 1415 instead of outputting a voltage greater than (>) Vth, is shown outputting a zero (0) voltage (i.e., V=0) or some voltage less than (<) Vth. As a result of the reduced voltage, the LC 1410 acts to switch the polarization of the input light. In the FIG. 14D example, the RH circular polarized light input to the LC 1410 is output from the LC as LH circular polarized light. The LH circular polarized light output from the LC 1410 is input to the passive PG 1420. The passive PG 1420 diffracts the LH circular polarized light to the same predetermined angle but as a +1 state output, and also changes the polarization of the inputted light from LH circular to RH circular polarized light.

The examples of FIGS. 14A-14D may be implemented as spatial modulators, such as in FIGS. 4 and 5, that receive light from light sources. The LCPGs of FIGS. 14A-14D may be implemented on a pixel level or may be used to process light output from multiple pixel light sources.

Other configurations that incorporate PGs, LCs and LCPGs are also contemplated. FIG. 15A illustrates an example of a pixel in a pixel controllable light generation and spatial light distribution system using polarization gratings (PG) technology for spatial modulation.

FIG. 15A illustrates the use of switchable PGs stack for beam steering of single pixel. The single pixel 1500 includes light source 1510, a lens 1520, a passive PG 1530, and a beam steering assembly 1570. The beam steering assembly 1570 includes, in this example, active PG or LCPG stacks 1541 and 1542 and voltage sources 1551 and 1552. The single pixel 1500 may be implemented, for example, as an entire 2 feet by 2 feet lighting fixture or, on a smaller scale, as one pixel in an array of pixels. The lens 1520 may be a TIR lens, a reflector lens, a microlens, or an aligned microlens film. The lens 1520 is provided to collimate unpolarized light output by the light source 1510. The passive PG 1530 is a single layer PG in this example, but, in other examples, may be a stack of PGs or LCPGs. The passive PG 1530 processes the collimated light output from the lens 1520 by separating the unpolarized light into LH (labeled A-LH) and RH (labeled B-RH) circular polarized light.

The system 1500 provides selectable beam steering angles by using switchable, active PGs 1541 and 1542 stacked upon one another to control the beam steering angle of the light output from the system 1500. In particular, the RH and LH circular polarized light input to the respective active stacks 1541 and 1542 is processed based on the voltage applied by the respective voltage sources 1551 and 1552. The voltage sources 1551 and 1552 may respond to control signals provided by a controller (not shown). In addition, while the voltage sources 1551 and 1552 are shown separately, a single voltage source may be used. Similar to the discussion of FIGS. 13A-13C, the respective active stacks 1541 and 1542 are controllable to provide a range of beam steering angles, such as between ±40°. Different combinations of PGs (active and/or passive) and/or LCPGs provide different ranges of beam steering angles. In addition, the number of PGs and/or LCPGs is determined by a beam step resolution and the largest beam steering angle, which will be discussed in more detail with reference to FIG. 15B.

Figure 15C:
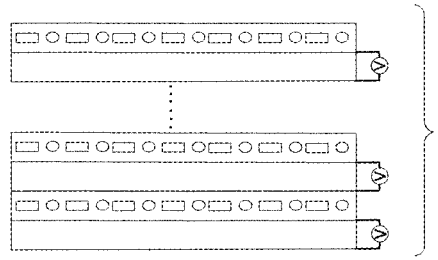
FIGS. 15B and 15C illustrate examples of the concept of stacking PGs in an example for controlling the beam steering angle of input light, e.g. for use in the active stack portion of the pixel of FIG. 15A.
Figure 15B:
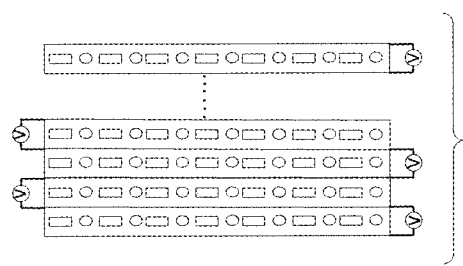
Figure 15A:
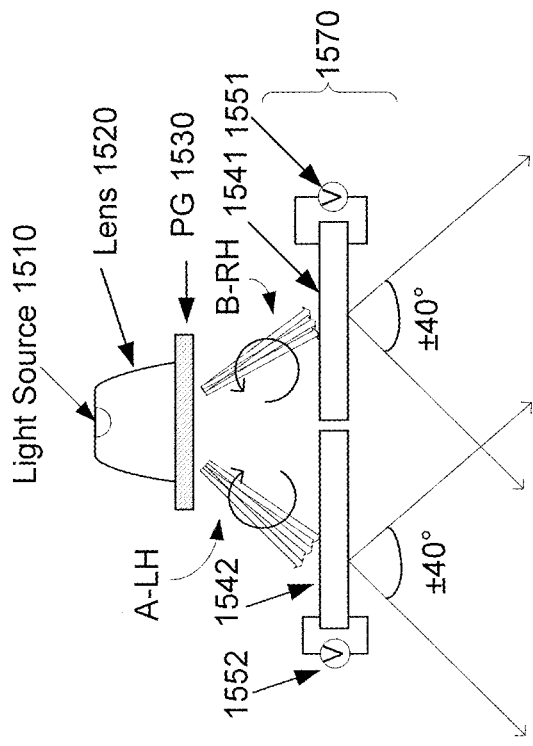
FIG. 15A illustrates an example of a pixel of a pixel controllable light generation and spatial light distribution system using polarization gratings (PG) technology for spatial modulation.

FIGS. 15B and 15C illustrate examples of the concept of stacking PGs in an example for controlling the beam steering angle of input light, e.g. for use in the active stack 1541/1542 portion of the pixel of FIG. 15A.

FIG. 15B shows an active stack, such as 1541, having multiple active PGs. In a specific example, the PG beam steering assembly 1575 includes first and second active PG stacks having different beam step resolutions. For example, beam step resolution is the smallest angular displacement of an individual PG in the stack of PGs. For example, the angular displacement for active stack 1541 shown in FIG. 15A is ±40°. Of course, ±40° is only an example, other angular displacements may be possible depending upon stacking of PG elements and/or geometry of the respective assemblies 1575 (and 1576). One of the PGs in the stack may permit only a 2° angular displacement. The 2° angular displacement enables the stack 1541 to step through the ±40° angular displacement in 2° intervals. Accordingly, in this example, the described stack has a beam step resolution of 2°. Multiple active PG stacks may be further stacked together to obtains the desired image display and general lighting illumination.

FIG. 15C shows an active stack having multiple LCs with passive PGs. The active PGs 1541 and 1542 are similar to the pixel spatial light modulators 311 of FIGS. 4 and 5. Similar to the example of FIG. 15C, a pixel spatial light modulator may include for each pixel, such as 1500, a LCPG beam steering assembly 1576. Different implementations of the LCPG may be used in the beam steering assembly 1576. In a first implementation, as shown in the example in FIG. 15C, the LCPG in the beam steering assembly 1576 includes a plurality of active switchable LC half-waveplates and a plurality passive PGs interspersed with the active switchable LC half-waveplates. In a second implementation example (not shown), the LCPG in the beam steering assembly 1576 may include an LC half-wave plate and an active PG.

Alternatives to LCPG examples include vertical-continuous optical phased arrays (V-COPA), controllable graded index (GRIN), and microlens array based on liquid crystal materials.

V-COPA is a liquid crystal based technology capable of tunable angle beam steering. In an example, patterned electrodes, such as in a checkerboard pattern, are used in combination with vertically aligned liquid crystal materials. In the example, when no voltage is applied, the liquid crystals are vertically aligned to the substrate and the structure is optically transparent. By using high resolution patterned electrodes, when a voltage is applied, the liquid crystals can be caused to align in arbitrary patterns to provide arbitrary beam shaping and beam steering. The resolution, or number, of the electrodes needed to provide the arbitrary patterns limits the maximum achievable angle and resolution. V-COPA technology may be used in combination with a large angle approach, such as volume holograms, to provide greater steering angle ranges.

Another LCPG alternative is the controllable GRIN lens array based on liquid crystal materials. Since LCs are birefringent, the refractive index depends on the orientations of the LC in the array. Similar to the V-COPA solution, the resolution, or number, of the electrodes needed to provide the arbitrary patterns for beam shaping/beam steering limits the maximum achievable angle and resolution. By applying an electric filed to the LC material, a controllable GRIN lens suitable for beam shaping may be achieved that has an index profile dependent on the arbitrary electrode pattern.

The third example of an LC solution is a microlens array based on liquid crystal materials (LC). This approach is also based on the birefringent properties of LCs in which a voltage applied to LC-based microlens controls the beam shaping capabilities of the microlens array.

Figure 16A:
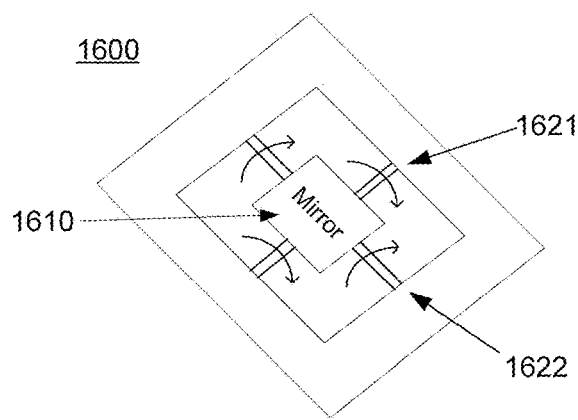
FIG. 16A illustrates an example of a single two-dimensional (2D) micro-electrical mechanical system (MEMS) mirror that can rotate in 2 directions responsive to an applied voltage, for example, for use in a pixel spatial modulator.

Another approach to providing spatial modulation may be through the use of micro-electrical mechanical systems (MEMS). Various MEMS technologies exist that are reflective (Digital Micro-Mirror (DMD), tip/tilt/piston analog mirrors, Interferometric Modulator (IMOD)), transmissive (Digital Micro Shutter (DMS), Micro-Optical Switch (MOS)), and diffractive (Grating Light Valve (GLV)). The following description of a MEMS device is only an example of but one MEMS implementation of a controllable optical spatial modulator, other implementations are envisioned and other MEMs devices may be used. FIG. 16A illustrates an example of a single two-dimensional (2D) micro-electrical mechanical system (MEMS) mirror. The other technologies mentioned above may be used individually or in combination to achieve similar functionality as the example of a 2D analog MEMS mirror shown in FIG. 16A. The MEMS device 1600, for example, may be configured for use in a pixel spatial modulator, such as 111 of FIG. 1 or 311*b* of FIG. 5A. The MEMS device 1600 is coupled to a driver system such as 113, 313, 363 or the like, and is responsive to control signals received from the driver system. In some examples, the driver is a driver specialized for providing drive signals to the MEMS device 1600.

In an example, the MEMS device 1600 uses a MEMs mirror 1610, although other micro-scale optical elements may be used, such as a lens or prism. As shown, the mirror 1610 of the MEMS device 1600 is rotatable in two (2) directions (about the X-Y axes) as well as controllable in the vertical plane, or along the Z axis (e.g., up and down) in response to an applied voltage. In other words, the MEMs device 1600 may provide rotational pan and tilt movement as well as piston-like movements of the mirror 1610. For example, a voltage applied to electrodes (not shown) may cause rotation in a first axial direction 1621, and as the voltage changes, the mirror may rotate a number of degrees corresponding to the changes in voltage. Similarly, voltage applied to a different set of electrodes may cause the mirror 1610 to rotate in a second axial direction 1622. Unless the mirror or the connections to the mirror are sufficiently flexible, the rotation of the mirror 1610 may be limited to rotation in a single axial direction at one time. Only after stopping to rotate in the selected axial direction, such as 1621, may the mirror 1610 begin to rotate in the other axial direction, which is subsequently selected. Similarly, the mirror 1610 may be controlled to move up and down in the third axial direction after stopping rotation in either the first or second axial directions. In other examples, movement in two axial directions (e.g., X and Z, or Y and Z) may also be provided. In other configurations, the MEMS mirror 1610 may provide a beam focusing functionality (e.g., by forming a convex mirror) over a range of angles, for example, by changing curvature in response to electromechanically applied forces.

Figure 16B:
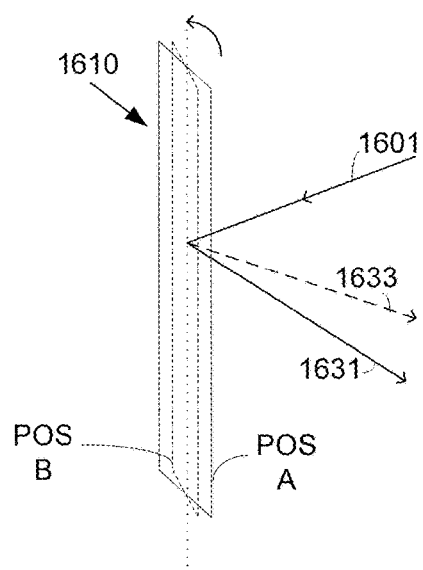
FIG. 16B shows how light direction changes due to rotation of the single 2D MEMS mirror of FIG. 16A.

FIG. 16B shows an example of a MEMS mirror causing the light direction being changed by the rotating mirror 1610. For example, the incident light 1601 from a light source (not shown in this example) is reflected in a particular direction 1631 when the mirror 1610 is in position A. In response to a control signal, the mirror 1610 rotates to position B and the incident light 1601 is reflected in a new direction 1633.

Figure 16C:
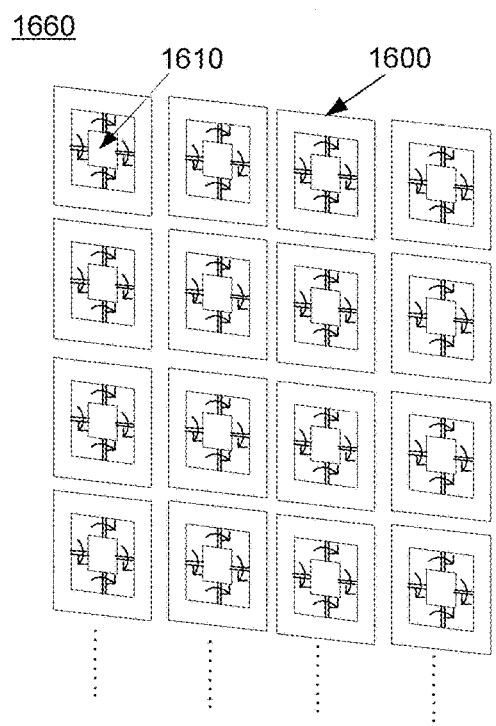
FIG. 16C shows an example MEMS mirror array formed from the single 2D MEMS of FIG. 16A that facilitates beam steering and beam steering.

It is envisioned that a number of MEMS devices 1600 may be configured in an array. FIG. 16C shows a MEMS mirror array 1660 suitable for beam shaping and deflection, each single MEMS mirror 1610 may be individually controlled to achieve the deflection angle required of a spatial modulator pixel in response to an input beam from a light source.

For example, each of the pixel spatial light modulators includes a micro-electro-mechanical systems (MEMs) mirror as shown in FIG. 16C. Each MEMS mirror 1610 in the array 1660 is capable of changing position in response to commands from the processor and/or the driver. The position changes of the MEMs mirror 1610 facilitates light beam shaping and light beam distribution.

The above discussion of FIGS. 13A-16C provides examples of different arrangements of spatial modulators that are controllable at the pixel level to provide beam shaping and beam steering functionalities. The advantages provided by the described examples allows for an image display of, for example, a virtual lighting fixture that is presented by an example of a described lighting device while providing selected general illumination distributions, including illumination that may not be provided by a physical lighting fixture that corresponds to the virtual lighting fixture.

Also, as mentioned above, the spatial modulators may incorporate one or more technologies. In more detail, a spatial modulator may utilize light scattering based beam shaping devices. Light scattering based beam shaping devices, in contrast to beam steering technologies discussed above, include several technologies that accomplish rudimentary beam shaping by electrically controlled optical scattering. Examples of the light scattering technologies include electro-chromic materials, electrophoretic inks (e-ink), polymer dispersed liquid crystals (PDLCs), polymer stabilized cholesteric texture liquid crystals (PSCT-LCs) that are more commonly used for smart window and privacy window type applications. All these technologies are available either as embedded in glass or as separate films easily laminated on glass. In all cases, applied voltage can be used to control the diffusivity of the film/glass. In one example, the glass/film has two discrete states: a first state that is completely transparent and does not alter the source beam shape, and a second state that is completely diffuse such that the incoming light is scattered into random directions uniformly. In another examples, the diffusivity can be varied by controlling value of the applied voltage. For some of these technologies, such as PSCT-LCs, the two discrete states are bistable i.e. no voltage is required to maintain the extreme states and voltage is only required to control the switching in between. In addition, pigments may be added the PSCT-LC to provide color control. Also, in all of the examples, electrodes may be arrayed (i.e., pixelated) using individual transistor, such as thin film transistor (TFT), control to address individual sections and provide greater control such as providing patterns of light on a display surface.

Another example of a spatial modulator includes cascaded passive optics. Cascaded passive optics is a sub category of techniques using mechanical motion of passive optics to achieve continuous beam steering. In one example, continuous beam steering may be achieved by positioning and moving one or more two-dimensional (2D) micro-lens arrays in a particular plane of motion to continuously steer the beam. Other passive optical films that may be used include micro-prisms, diffraction gratings, and/or combinations of such optics.

In addition to or alternatively from cascaded passive optics, passive control may be obtained using segment control via, for example, an X-Y area and pixels. This control approach achieves beam steering by using multiple LEDs coupled to corresponding multiple passive optics. The assumption here is the cost of using and driving multiple LEDs in conjunction with passive optics is less expensive than similar active optics to achieve the same effect. For example, if a particular brightness and/or color is selected, an M×N array of LEDs are desired for the luminaire operation to achieve the selected brightness and/or color, the resolution of the LED array may be increased to (K*M× L*N), where K*L is the number of beam steering/beam shaping stages. In such an example, each K×L "sub-pixel" consists of individual LEDs coupled to corresponding passive lens/prism/diffraction grating/other passive optic to provide the respective beam shaping/beam steering function. Therefore within the K×L array, some passive optics may have a first set of attributes (lens=focal length A, prism=wedge angle B, diffraction grating=period C, wavelength D, or the like) and other passive optics in the same K×L array will have a second set of attributes (lens=focal length B, prism=wedge angle A, diffraction grating=period J, wavelength C, or the like). Of course, the number of sets of attributes for the passive optics is not limited. For example, an array may have passive optics having one set, ten sets or tens of thousands of sets of different attributes.

Also suitable as a spatial modulators are volume holograms. Volume holograms are "thick" diffraction gratings that are highly efficient, highly wavelength selective, highly angle selective beam steering devices capable of providing large angle beam steering. Due to their wavelength/angle sensitivity and passive nature, volume holograms are usually used in combination with other small angle active beam steering approaches, such as liquid crystal based approaches, to collectively provide large angle beam steering. For example, several volume holograms, such as 10s-100s of volume holograms, may be stacked together to cover large angle and wavelength ranges. In addition to large angle beam steering, volume holograms can be used to provide complex beam shapes by appropriately recording such patterns in a recordable optical medium material. Examples of recordable optical medium materials include photo-thermal refractive glass, holographic polymer dispersed liquid crystals (HPDLCs), or the like.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

Figure 19:
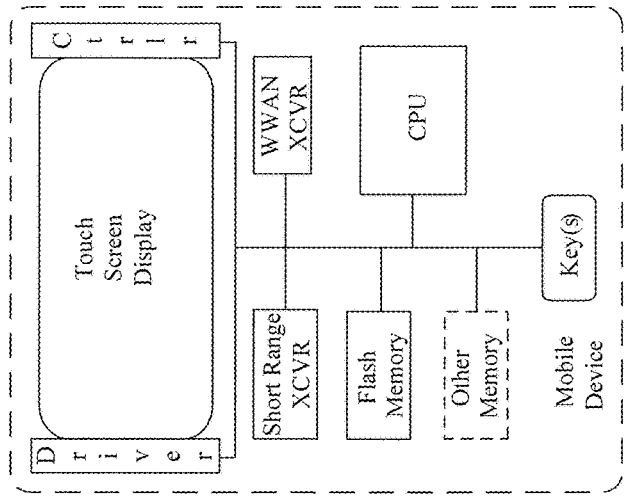
FIG. 19 is a simplified functional block diagram of a mobile device, as an alternate example of a user terminal device, for possible communication with the lighting device of FIG. 2.
Figure 18:
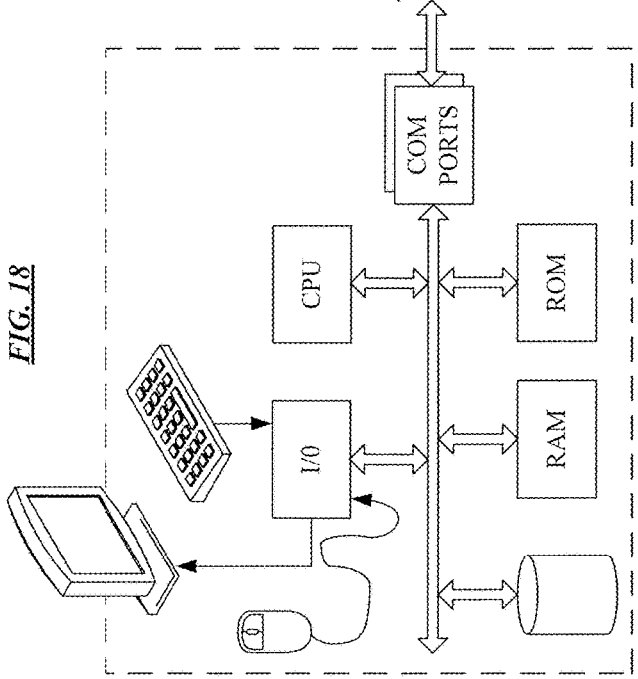
FIG. 18 is a simplified functional block diagram of a personal computer or other user terminal device, which may communicate with the lighting device of FIG. 2.
Figure 17:
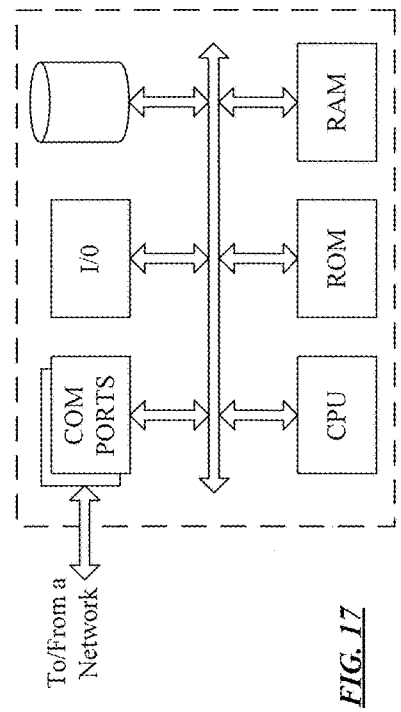
FIG. 17 is a is a simplified functional block diagram of a computer that may be configured as a host or server, for example, to supply configuration information or other data to the software configurable lighting device of FIG. 2.

As shown by the above discussion, although many intelligent processing functions are implemented in lighting device, at least some functions may be implemented via communication with general purpose computers or other general purpose user terminal devices, although special purpose devices may be used. FIGS. 17-19 provide functional block diagram illustrations of exemplary general purpose hardware platforms.

FIG. 17 illustrates a network or host computer platform, as may typically be used to generate and/or receive lighting device 11 control commands and access networks and devices external to the lighting device 11, such as host processor system 115 of FIG. 2 or implement light generation and modulation 170 and control functionality 180. FIG. 18 depicts a computer with user interface elements, as may be used to provide the user experience 190, as shown in FIG. 1, although the computer of FIG. 18 may also act as a server if appropriately programmed. The block diagram of a hardware platform of FIG. 19 represents an example of a mobile device, such as a tablet computer, smartphone or the like with a network interface to a wireless link, which may alternatively serve as a user terminal device for providing a user experience such as 190. It is believed that those skilled in the art are familiar with the structure, programming and general operation of such computer equipment and as a result the drawings should be self-explanatory.

A server (see e.g. FIG. 17), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. A server, such as that shown in FIG. 17, may be accessible or have access to a lighting device 11 via the communication interfaces 117 of the lighting device 11. For example, the server may deliver in response to a user request a configuration information file. The information of a configuration information file may be used to configure a software configurable lighting device, such as lighting device 11, to set light output parameters comprising: (1) light intensity, (2) light color characteristic and (3) spatial modulation, in accordance with the lighting device configuration information. In some examples, the lighting device configuration information include an image for display by the lighting device and at least one pixel level setting for at least one of beam steering or beam shaping by the lighting device. The configuration information file may also include information regarding the performance of the software configurable lighting device, such as dimming performance, color temperature performance and the like. The configuration information file may also include temporal information such as when to switch from one beam shape or displayed image to another and how long the transition from one state to another should take. Configuration data may also be provided for other states, e.g., for when the virtual luminaire is to appear OFF, in the same or a separate stored data file.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 18). A mobile device (see FIG. 19) type user terminal may include similar elements, but will typically use smaller components that also require less power, to facilitate implementation in a portable form factor. The example of FIG. 19 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 17 and the terminal computer platform of FIG. 18 are shown by way of example as using a RAM type main memory and a hard disk drive for mass storage of data and programming, whereas the mobile device of FIG. 19 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/ selection device such as a mouse, trackball, joystick or touchpad; and a display for visual outputs (see FIG. 18). The mobile device example in FIG. 19 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

The user device of FIG. 18 and the mobile device of FIG. 19 may also interact with the lighting device 11 in order to enhance the user experience 190. For example, third party applications 191 may correspond to control parameters of a software configurable lighting device, such as spatial modulation and In addition in response to the user controlled input devices, such as I/O of FIG. 18 and touchscreen display of FIG. 19, the lighting device, in some examples, is configured to accept input from a host of sensors, such as sensors 121. These sensors may be directly tied to the hardware of the device or be connected to the platform via a wired or wireless network. For example, a daylight sensor may be able to affect the light output from the illumination piece of the platform and at the same time change the scene of display as governed by the algorithms associated with the daylight sensor and the lighting platform. Other examples of such sensors can be more advanced in their functionality such as cameras for occupancy mapping and situational mapping.

The lighting device 11 in other examples is configured to perform visual light communication. Because of the beam steering (or steering) capability, the data speed and bandwidth can have an increased range. For example, beam steering and shaping provides the capability to increase the signal-to-noise ratio (SNR), which improves the visual light communication (VLC). Since the visible light is the carrier of the information, the amount of data and the distance the information may be sent may be increased by focusing the light. Beam steering allows directional control of light and that allows for concentrated power, which can be a requirement for providing highly concentrated light to a sensor. In other examples, the lighting device 11 is configured with programming that enables the lighting device 11 to "learn" behavior. For example, based on prior interactions with the platform, the lighting device 11 will be able to use artificial intelligence algorithms stored in memory 125 to predict future user behavior with respect to a space.

As also outlined above, aspects of the techniques form operation of a software configurable lighting device and any system interaction therewith, may involve some programming, e.g. programming of the lighting device or any server or terminal device in communication with the lighting device. For example, the mobile device of FIG. 19 and the user device of FIG. 18 may interact with a server, such as the server of FIG. 17, to obtain a configuration information file that may be delivered to a software configurable lighting device 11. Subsequently, the mobile device of FIG. 19 and/or the user device of FIG. 18 may execute programming that permits the respective devices to interact with the software configurable lighting device 11 to provide control commands such as the ON/OFF command or a performance command, such as dim or change beam steering angle or beam shape focus. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 11 via communication interfaces 117, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
    a pixel controllable light generation and pixel controllable spatial light distribution system, wherein the pixel controllable light generation and pixel controllable spatial light distribution system includes at least one pixelated light source and/or multi-color light source;
    a driver coupled to the controllable system to control at a pixel level, light generated by the system and to control at a pixel level, a spatial distribution of the generated light;
    a memory;
    a processor having access to the memory and coupled to the driver to control operation of the driver; and
    programming in the memory, wherein execution of the programming by the processor configures the lighting device to perform functions including functions to:
        obtain an image selection and a general lighting distribution selection as software control data;
        present an image output, based on the image selection;
        emit light, via the at least one pixelated light source and/or multi-color light source, for general illumination from the lighting device and having the selected light distribution for an area of the lighting device;
        time division multiplex lighting device output during repetitions of a duty cycle including a general illumination lighting time duration and a display presentation time duration, to emit the light for general illumination having the selected light distribution during the general illumination lighting time duration of each repetition of the duty cycle and to display the image output during the display presentation time duration of each repetition of the duty cycle distinctly different from the general illumination lighting time duration of each repetition of the duty cycle; and
        during the display presentation time duration, supply a plurality of timing signals corresponding to the light distribution for the image selection to drive spatial modulation by pixel controllable light generation and pixel controllable spatial light distribution system, to enable the image output on the lighting device during each repetition of the duty cycle.

2. The lighting device of claim 1, wherein the pixel controllable system comprises a matrix of pixels, each pixel including:
    a pixel light source electrically controllable with respect to one or more light output parameters comprising light intensity or light color characteristic; and
    a pixel spatial light modulator optically coupled to process light from the light source of the pixel and configured to be electrically controllable with respect to at least one of beam shape or beam distribution of light from the pixel light source.

3. The lighting device of claim 2, wherein the driver is configured to provide image drive signals to the light sources of the pixels and modulation control signals to the spatial light modulators of the pixels.

4. The lighting device of claim 2, wherein the pixel light source comprises a source selected from the group consisting of:
    planar light emitting diodes (LEDs) of different colors;
    a micro LED;
    organic LEDs of different colors;

pixels of an organic LED display;
LEDs on gallium nitride (GaN) substrates of different colors;
nanowire or nanorod LEDs of different colors;
photo pumped quantum dot (QD) LEDs of different colors;
plasmonic LEDs of different colors;
pixels of a plasma display;
laser diodes of different colors;
micro LEDs of different colors;
resonant-cavity (RC) LEDs of different colors;
Super luminescent Diodes (SLD) of different colors; and
photonic crystal LEDs of different colors.

5. The lighting device of claim 2, wherein each of the pixel spatial light modulators comprises an electrically controllable liquid lens.

6. The lighting device of claim 2, wherein each pixel spatial light modulator comprises an electrically controllable liquid prism.

7. The lighting device of claim 6, wherein each of pixel spatial light modulator further comprises an electrically controllable liquid lens.

8. The lighting device of claim 2, wherein each pixel spatial light modulator comprises a light scattering based beam shaping device selected from one or more of electrochromic materials, an electrophoretic ink, polymer dispersed liquid crystals, or polymer stabilized cholesteric texture liquid crystals.

9. The lighting device of claim 1, wherein the pixel controllable system comprises a spatial modulator comprising at least one controllable optic selected from the group consisting of:
(a) MEMS and NEMS based Dynamic Optical Beam Control;
(b) Electrowetting based Dynamic Optical Beam Control;
(c) Passive control using segment control (X-Y area and pixels);
(d) Holographic films; and
(e) LCD Materials.

10. The lighting device of claim 2, wherein for each pixel:
the pixel light source comprises a plurality of controllable sources of light of different color characteristics; and
the pixel spatial light modulator comprises a plurality of electrically controllable liquid lenses or prisms, one of the lenses or prisms being optically coupled to spatially modulate light output from a respective one of the plurality of controllable sources of light of one of the different colors.

11. The lighting device of claim 2, wherein each pixel further comprises a microlens film aligned on top of the light source of the pixel for collimating the light from the light source output to the spatial light modulator of the pixel.

12. The lighting device of claim 2, wherein for each pixel:
the pixel light source comprises a plurality of controllable sources of light of different color characteristics; and
the pixel spatial light modulator is a single electrically controllable liquid lens and/or liquid prism optically coupled to spatially modulate light output from all of the plurality of controllable sources of light of one of the different colors of the pixel.

13. The lighting device of claim 2, wherein for each pixel, the pixel spatial light modulator comprises a liquid crystal polarization grating (LCPG) beam steering assembly.

14. The lighting device of claim 13, wherein the LCPG beam steering assembly comprises a liquid crystal half-waveplate and an active switchable polarization grating.

15. The lighting device of claim 13, wherein the LCPG beam steering assembly comprises a plurality of active switchable liquid crystal half-waveplates and a plurality of passive polarization gratings interspersed with the active switchable liquid crystal half-waveplates.

16. The lighting device of claim 13, wherein the LCPG beam steering assembly comprises:
a first polarization grating optically coupled to the pixel light source and configured to angularly separate light from the pixel light source into light of different first and second polarizations; and
first and second active polarization grating stacks optically coupled to the first polarization grating to respectively receive the light of the first and second polarizations, each of the active polarization grating stacks being configured to selectively steer the respective light of the first and second polarizations in response to a respective beam steering control signal from the driver.

17. The lighting device of claim 2, wherein each of the pixel spatial light modulators comprises a micro-electromechanical systems (MEMS) mirror.

18. The lighting device of claim 1, wherein execution of the programming by the processor further configures the lighting device to emit the light for general illumination having the selected light distribution simultaneously with the image output.

19. The lighting device of claim 1, further comprising:
a sensor,
wherein execution of the programming by the processor configures the lighting device to perform a further function to control at least one parameter of the emitted light for general illumination having the selected light distribution or of the presentation of the image, responsive to a condition detected by the sensor.

20. The lighting device of claim 1, further comprising:
an interface coupled to receive a user input,
wherein execution of the programming by the processor configures the lighting device to perform a further function to control at least one parameter of the emitted light for general illumination having the selected light distribution or of the presentation of the image, responsive to the received user input.

21. A lighting device, comprising:
a light generation and distribution system configurable at a pixel level with respect to light output parameters, the light output parameters comprising at least one of light intensity or light color characteristic, wherein the light generation and distribution system includes at least one of a pixelated light source and/or a multi-color light source, and the light output parameters further comprise spatial modulation parameters;
a programmable controller coupled to the light generation and distribution system to set the light output parameters in accordance with data processed by the controller, and
programming executable by the controller to configure the programmable controller to control the light generation and distribution system according to the light output parameters such that the light generation and distribution system, according to a time division multiplexing scheme presents an image output, based on an image setting, and emits light, via the at least one pixelated light source and/or multi-color light source, for general illumination from the lighting device and having a selected light distribution for the generated light based on a spatial modulation setting, wherein:

the time division multiplexing scheme provides lighting and image output from the lighting device during repetitions of a duty cycle including a general illumination lighting time duration and a display presentation time duration, to emit the light for general illumination having the selected light distribution during the general illumination lighting time duration of each repetition of the duty cycle and to display the image output during the display presentation time duration of each repetition of the duty cycle distinctly different from the general illumination lighting time duration of each repetition of the duty cycle, and during each display presentation time duration, control the light generation and distribution system according to the spatial modulation parameters and corresponding to the light distribution, to enable the image output on the lighting device during each repetition of the duty cycle.

22. The lighting device of claim 21, wherein programming executable by the controller configures the programmable controller to control the light output parameters such that the light generation and distribution system:

presents an image output, based on an image setting; and simultaneously with the image output, emits light for general illumination having a selected light distribution from at least a portion of an area of the image output based on a spatial modulation setting.

23. The lighting device of claim 21, wherein the light generation and distribution system comprises:

a number of individually controllable light sources arranged in a matrix of light source pixels; and a number of individually controllable spatial modulators arranged in a matrix of spatial modulator pixels.

24. The lighting device of claim 23, wherein the number of individually controllable light sources arranged in the matrix of light source pixels is greater than the number of individually controllable spatial modulators arranged in the matrix of spatial modulator pixels.

25. The lighting device of claim 23, wherein the number of individually controllable light sources arranged in the matrix of light source pixels is less than the number of individually controllable spatial modulators arranged in the matrix of spatial modulator pixels.

26. A lighting device, comprising:

a controllable light generation and spatial light distribution system;

a driver coupled to the controllable system to control light generated by at least one pixelated light source and/or multi-color light source of the system and to control a spatial distribution of the generated light of a spatial modulator of the system;

a memory;

a processor having access to the memory and coupled to the driver to control operation of the driver; and programming in the memory, wherein execution of the programming by the processor configures the lighting device to perform functions including functions to:

obtain an image selection of a luminaire and a general lighting distribution selection as software control data from a configuration file;

present an image output, based on the image selection;

emit light, via the at least one pixelated light source and/or multi-color light source for general illumination from the lighting device and having the selected light distribution, wherein the selected light distribution is a custom light distribution disassociated from the selected luminaire image;

time division multiplex lighting device output during repetitions of a duty cycle including a general illumination lighting time duration and a display presentation time duration, to emit the light for general illumination having the selected light distribution during the general illumination lighting time duration of each repetition of the duty cycle and to display the image output during the display presentation time duration of each repetition of the duty cycle distinctly different from the general illumination lighting time duration of each repetition of the duty cycle, and during the display presentation time duration, operate the spatial modulator to enable the image output on the lighting device during each repetition of the duty cycle.

27. The lighting device of claim 26, further comprising:

a sensor, wherein execution of the programming by the processor configures the lighting device to perform a further function to control at least one parameter of the emitted light for general illumination having the selected light distribution or of the presentation of the image, responsive to a condition detected by the sensor.

28. The lighting device of claim 26, further comprising:

an interface coupled to receive a user input, wherein execution of the programming by the processor configures the lighting device to perform a further function to control at least one parameter of the emitted light for general illumination having the selected light distribution or of the presentation of the image, responsive to the received user input.

* * * * *